(12) United States Patent
Quint et al.

(10) Patent No.: US 11,914,840 B2
(45) Date of Patent: Feb. 27, 2024

(54) CHARGER MAP OVERLAY AND DETAIL CARD

(71) Applicant: Rivian IP Holdings, LLC, Plymouth, MI (US)

(72) Inventors: Jason Meyer Quint, Ann Arbor, MI (US); Kok Wei Koh, Mountain View, CA (US); Brennan Matthew Boblett, Orinda, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 107 days.

(21) Appl. No.: 17/380,359

(22) Filed: Jul. 20, 2021

(65) Prior Publication Data
US 2023/0028206 A1    Jan. 26, 2023

(51) Int. Cl.
   *G06F 3/048*      (2013.01)
   *G06F 3/04817*    (2022.01)
   *H02J 7/00*       (2006.01)
   *G06F 3/0482*     (2013.01)
   *G06F 3/04845*    (2022.01)

(52) U.S. Cl.
   CPC ........ *G06F 3/04817* (2013.01); *G06F 3/0482* (2013.01); *G06F 3/04845* (2013.01); *H02J 7/0047* (2013.01); *G06F 2203/04806* (2013.01)

(58) Field of Classification Search
   CPC ............ G01C 21/3679; G01C 21/3476; G01C 21/3811
   See application file for complete search history.

(56) References Cited

U.S. PATENT DOCUMENTS

| | | | | |
|---|---|---|---|---|
| 7,783,492 B2* | 8/2010 | Bangalore | ............. | G06F 3/0481 |
| | | | | 704/235 |
| 8,401,785 B2* | 3/2013 | Cho | .................... | G01C 21/3614 |
| | | | | 701/426 |
| 10,024,669 B2* | 7/2018 | Meyer | ................ | G01C 21/3438 |
| 10,496,252 B2* | 12/2019 | Ren | ........................ | G01C 21/367 |
| 11,315,296 B2* | 4/2022 | Mongrain | ............. | G06T 11/001 |
| 2002/0133292 A1* | 9/2002 | Miyaki | .............. | G01C 21/3679 |
| | | | | 701/410 |

(Continued)

OTHER PUBLICATIONS

Ferreira et al., Mobi_System: A Personal Travel Assistance for Electrical Vehicles in Smart Cities, 2011, IEEE, 6 pages.*

*Primary Examiner* — Linh K Pham
(74) *Attorney, Agent, or Firm* — Haley Guiliano LLP

(57) ABSTRACT

Systems and methods are provided for presenting information related to electric charging stations for charging an electric vehicle. A first plurality of icons corresponding to an identified plurality of electric charging stations may be generated for presentation on a display. A zoom command to modify a zoom level of the map interface may be received, and in response to receiving the zoom command, a subset of the plurality of electric charging stations having a charging speed above a threshold charging speed may be identified, and a second plurality of icons, corresponding to the identified subset of the plurality of electric charging stations, may be generated for presentation at the display on a zoomed-out view of the map interface. Selectable options to display a detailed view of information related to an electric charger associated with an electric charger category from among multiple electric charger categories may be provided.

20 Claims, 22 Drawing Sheets

(56) References Cited

U.S. PATENT DOCUMENTS

| | | | |
|---|---|---|---|
| 2003/0018427 A1* | 1/2003 | Yokota | G01C 21/367 701/455 |
| 2003/0046087 A1* | 3/2003 | Johnston | G06F 3/0481 704/E15.041 |
| 2004/0243306 A1* | 12/2004 | Han | G01C 21/3682 340/995.14 |
| 2006/0026170 A1* | 2/2006 | Kreitler | G06F 16/29 |
| 2006/0206264 A1* | 9/2006 | Rasmussen | G01C 21/3881 340/995.15 |
| 2006/0247855 A1* | 11/2006 | de Silva | G01C 21/36 701/454 |
| 2008/0046418 A1* | 2/2008 | Johnston | G06F 40/151 |
| 2008/0162031 A1* | 7/2008 | Okuyama | G09B 29/007 701/532 |
| 2008/0238933 A1* | 10/2008 | Wako | G01C 21/367 345/617 |
| 2009/0177396 A1* | 7/2009 | Thomassen | G09B 29/106 715/835 |
| 2010/0094496 A1* | 4/2010 | Hershkovitz | B60L 50/66 701/22 |
| 2010/0106401 A1* | 4/2010 | Naito | B60L 53/00 701/533 |
| 2010/0169008 A1* | 7/2010 | Niwa | G09B 29/106 701/532 |
| 2011/0022259 A1* | 1/2011 | Niwa | G01C 21/3415 903/903 |
| 2011/0032110 A1* | 2/2011 | Taguchi | B60L 3/12 340/636.1 |
| 2011/0071758 A1* | 3/2011 | Cho | G01C 21/3679 701/431 |
| 2012/0019204 A1* | 1/2012 | Matsuo | B60L 53/60 320/109 |
| 2012/0098501 A1* | 4/2012 | Paryani | H02J 7/0069 320/156 |
| 2012/0109519 A1* | 5/2012 | Uyeki | B60L 53/68 701/426 |
| 2012/0194346 A1* | 8/2012 | Tsai | B60W 50/14 701/22 |
| 2013/0179061 A1* | 7/2013 | Gadh | B60L 53/305 701/1 |
| 2014/0207363 A1* | 7/2014 | Kanno | G01C 21/3469 701/123 |
| 2014/0214321 A1* | 7/2014 | Kawamata | G01C 21/3476 340/901 |
| 2014/0236403 A1* | 8/2014 | Liu | B60L 3/12 701/123 |
| 2014/0280180 A1* | 9/2014 | Edecker | G06F 16/285 707/769 |
| 2015/0224888 A1* | 8/2015 | Wild | B60L 53/65 705/26.9 |
| 2015/0226572 A1* | 8/2015 | North | B60L 53/66 701/400 |
| 2015/0294329 A1* | 10/2015 | Saito | B60L 3/0046 705/7.31 |
| 2015/0298565 A1* | 10/2015 | Iwamura | G06Q 10/04 701/22 |
| 2016/0116292 A1* | 4/2016 | An | H04W 4/025 701/454 |
| 2016/0185246 A1* | 6/2016 | Paul | B60L 53/65 320/106 |
| 2017/0030728 A1* | 2/2017 | Baglino | G01C 21/3469 |
| 2017/0087999 A1* | 3/2017 | Miller | B60L 58/12 |
| 2017/0168493 A1* | 6/2017 | Miller | G01C 21/3682 |
| 2018/0189686 A1* | 7/2018 | Díaz | B60L 53/305 |
| 2018/0322174 A1* | 11/2018 | Vasilyev | G06F 16/248 |
| 2019/0204840 A1* | 7/2019 | Park | G01C 21/3667 |
| 2019/0219417 A1* | 7/2019 | Quint | G01C 21/3632 |
| 2019/0383628 A1* | 12/2019 | Quint | G01C 21/3492 |
| 2021/0046841 A1* | 2/2021 | Cun | B60L 53/62 |
| 2021/0046843 A1* | 2/2021 | Maeda | B60L 53/62 |
| 2021/0300181 A1* | 9/2021 | Sakai | G01C 21/3469 |
| 2021/0352438 A1* | 11/2021 | Ford | H04W 4/029 |
| 2021/0389144 A1* | 12/2021 | Kim | G01C 21/3896 |
| 2022/0185143 A1* | 6/2022 | Takemura | B60L 53/68 |

* cited by examiner

CHARGER MAP OVERLAY AND DETAIL CARD

Many electric vehicles include a battery which must be charged periodically at a charging station to enable the battery to power the electric vehicle. As the popularity of electric vehicles continues to grow, more and more charging stations are being built to accommodate such charging of electric vehicles. However, it may be difficult for operators of electric vehicles to identify a suitable electric charging station for his or her vehicle for a current driving destination from among such a multitude of options. In one approach, a map interface is presented to the operator of the electric vehicle showing every available charging station in a given area. However, in such an approach the map interface becomes cluttered with representations of a large amount of charging stations, and it may be time consuming and cumbersome for an operator of the electric vehicle to comb through the large amount of charging stations in order to identify a suitable charging station. Consequently, what is needed are techniques to provide operators of electric vehicles with useful charging station information in an easily digestible format.

SUMMARY

In accordance with the present disclosure, systems and methods are provided to improve the presentation of icons corresponding to electric charging stations at a display of an electric vehicle and/or at a user device of an operator of the electric vehicle, in order to provide useful and concise information regarding electric charging stations to the operator. Certain types of electric charging stations can be intelligently displayed based on selections input to a map interface, e.g., to implement electric charge visibility as a function of zoom level. Icons may be displayed in a manner that enables an operator of an electric vehicle to easily digest and readily ascertain parameters of the electric charging station corresponding to the icons. Upon detecting selection of an icon corresponding to an electric charging station, display of more detailed information concerning electric chargers at the electric charging station may be optimized based on whether parameters of such electric chargers are the same (e.g., a homogenous electric charging station) or differ (e.g., a heterogenous electric charging station).

In accordance with the present disclosure, systems and methods are provided for presenting information related to electric charging stations for charging an electric vehicle. In some embodiments, the charging speed of electric charging stations is used to determine whether to include the charging stations on a map interface. For example, a zoomed-out view of a map interface can exclude slower speed chargers to declutter the map interface and provide more appropriate charging stations for longer distance traveling. In some embodiments, processing circuitry may be configured to identify a plurality of electric charging stations and generate, at the display a first plurality of icons on a map interface corresponding to the identified plurality of electric charging stations. The processing circuitry may detect a zoom command to modify a zoom level of the map interface, and in response to detecting the zoom command: identify a subset of the plurality of electric charging stations having a charging speed above a threshold speed; and generate at the display a second plurality of icons on a zoomed view of the map interface corresponding to the identified subset of the plurality of electric charging stations.

In some embodiments, the zoomed view comprises a zoomed-out view generated in response to determining the modified zoom level is below a predetermined zoom threshold.

In some embodiments, the first plurality of icons on the map comprise a first icon and a second icon corresponding to a first charging station and a second charging station, respectively, of the plurality of electric charging stations, the first charging station having a first charging speed and the second charging station having a second charging speed, and the first charging speed is different than the second charging speed. Each of the first charging speed and the second charging speed may exceed the threshold charging speed, where the first icon may be of a first color based on the first charging speed, and the second icon may be of a second color based on the second charging speed, the first color being a different color than the second color. The processing circuitry may be further configured to identify the first and second icons as the subset of the plurality of electric charging stations having the charging speed above the threshold charging speed; determine the charging speed of the first icon exceeds the charging speed of the second icon; and generate at the display the second plurality of icons on the zoomed-out view of the map interface by: generating a combined icon of the first color based on the determination that the charging speed of the first icon exceeds the charging speed of the second icon, where the combined icon is formed by collapsing the first icon and the second icon together.

In some embodiments, the processing circuitry is configured to generate the combined icon in response to determining that the first icon and the second icon are within a predetermined distance of each other on the map interface.

In some embodiments, the processing circuitry is further configured to: generate for presentation a selectable option to filter the electric charging stations for which icons are generated for display based on at least one of: electric charging station availability; electric charging station provider; and electric charging station speed.

In some embodiments, the processing circuitry is further configured to determine a plurality of characteristics of each respective electric charging station, wherein each respective icon is associated with the plurality of characteristics which comprise: a color indicative of a charging speed of an electric charger at the electric charging station; a size indicative of a number of electric chargers at the electric charging station; and an indication of a number of electric chargers that are available for use at the electric charging station. One of a lighter color or a darker color may be indicative of a relatively higher speed electric charger and one of the lighter color or the darker color may be indicative of a relatively lower speed electric charger. The color is indicative of a maximum speed electric charger at the electric charging station.

In some embodiments, the processing circuitry is further configured to determine respective parameters of an electric charging station of the identified plurality of electric charging stations and detect selection of an icon corresponding to the electric charging station. The processing circuitry may determine, based on the determined parameters, whether there are two or more categories of the plurality of electric chargers of the electric charging station corresponding to the selected icon. In response to determining there are the two or more categories, the processing circuitry may generate for display a graphical user interface comprising a selectable option, and in response to detecting selection of the selectable option, generate for display respective selectable options for each category of the two or more categories of the electric chargers, where each respective selectable option provides access to a detailed view of information related to at least one electric charger for the respective category. The graphical user interface comprising the selectable option may further comprise an indication that a parameter varies as between the two or more categories of electric chargers.

In some embodiments, the processing circuitry is further configured to determine respective parameters of an electric charging station of the identified plurality of electric charging stations; detect selection of an icon corresponding to the electric charging station; determine, based on the determined parameters, whether there is a single category of the plurality of electric chargers of the electric charging station corresponding to the selected icon; in response to determining there is a single category of the plurality of electric chargers: generate for display an indication of one or more common parameters for each of the plurality of electric chargers of the single category of the plurality of electric chargers.

In some embodiments, a non-transitory computer-readable medium is provided having non-transitory computer-readable instructions encoded thereon that, when executed by a processor, cause the processor to identify a plurality of electric charging stations; generate for presentation, at the display, a first plurality of icons on a map interface corresponding to the identified plurality of electric charging stations; detect a zoom-out command to modify a zoom level of the map interface; and in response to detecting the zoom-out command: identify a subset of the plurality of electric charging stations having a charging speed above a threshold charging speed; and generate for presentation, at the display, a second plurality of icons on a zoomed-out view of the map interface corresponding to the identified subset of the plurality of electric charging stations.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1A:
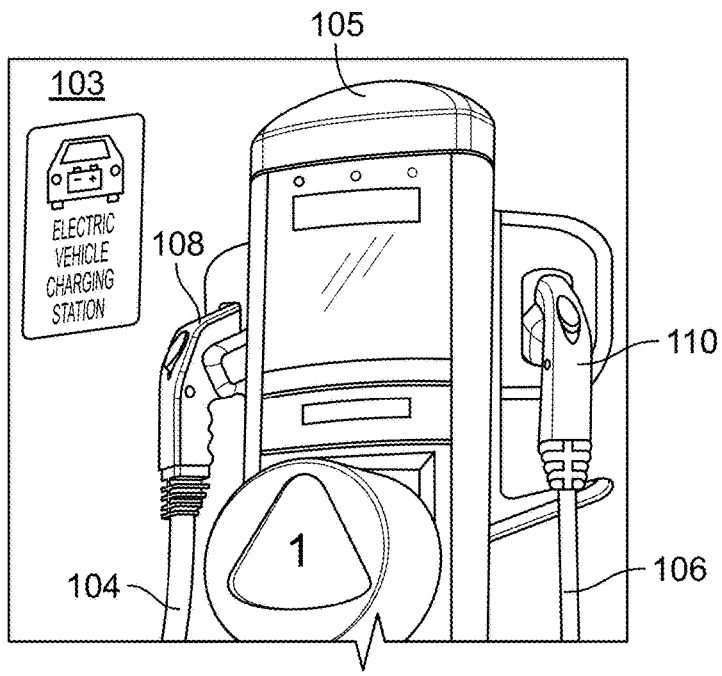
FIGS. 1A-1C show exemplary components of an electric vehicle charging system, in accordance with some embodiments of the present disclosure.
Figure 1B:
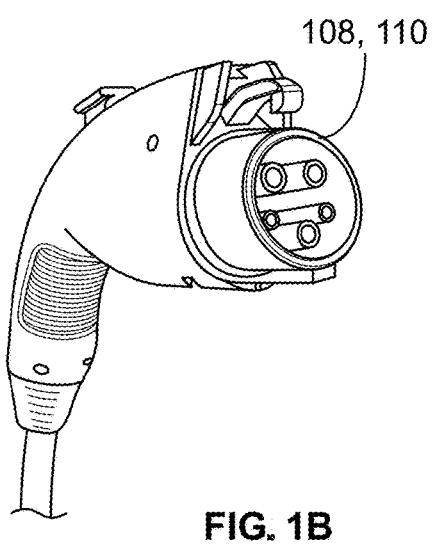
Figure 1C:
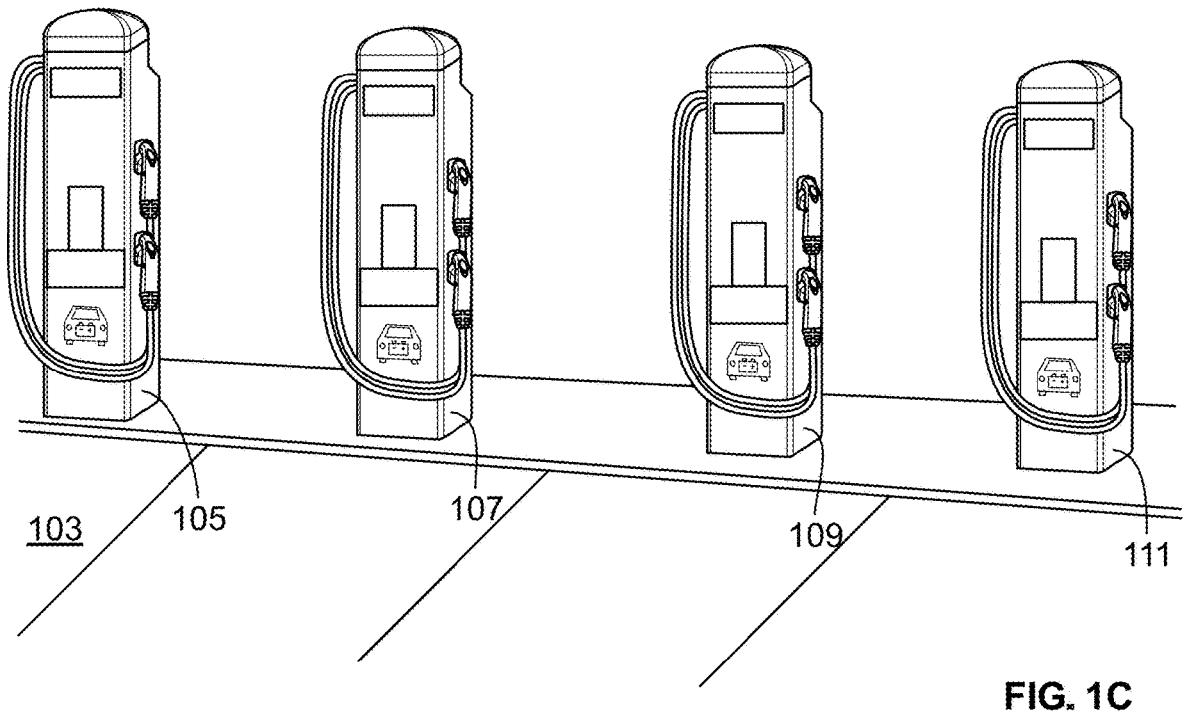

The present disclosure is directed to improved techniques for presenting information related to electric charging stations for charging an electric vehicle. FIGS. 1A-1C show exemplary components of an electric vehicle charging system, in accordance with some embodiments of the present disclosure. Electric vehicle charging station 103 may comprise one or more of electric vehicle supply equipment (EVSE) 105, 107, 109, 111, where each EVSE may correspond to one or more towers having one or more charging cords 104, 106 emanating therefrom. Charging cords 104, 106 may comprise plugs 108, 110, respectively, used to establish an electrical connection between EVSE 105 and an electric vehicle that is being charged at EVSE 105. In some embodiments, electric charging station 103 may correspond to a particular address or location, such as, for example, a parking lot or other designated area having one or more EVSEs 105, 107, 109, 111. In some embodiments, the electric charging station may be homogenous, e.g., all EVSEs and/or plugs on site have the same parameters (e.g., power level, pricing, hours, notes, etc.), or heterogenous, e.g., at least two EVSEs and/or plugs on site have different parameters.

Figure 2:
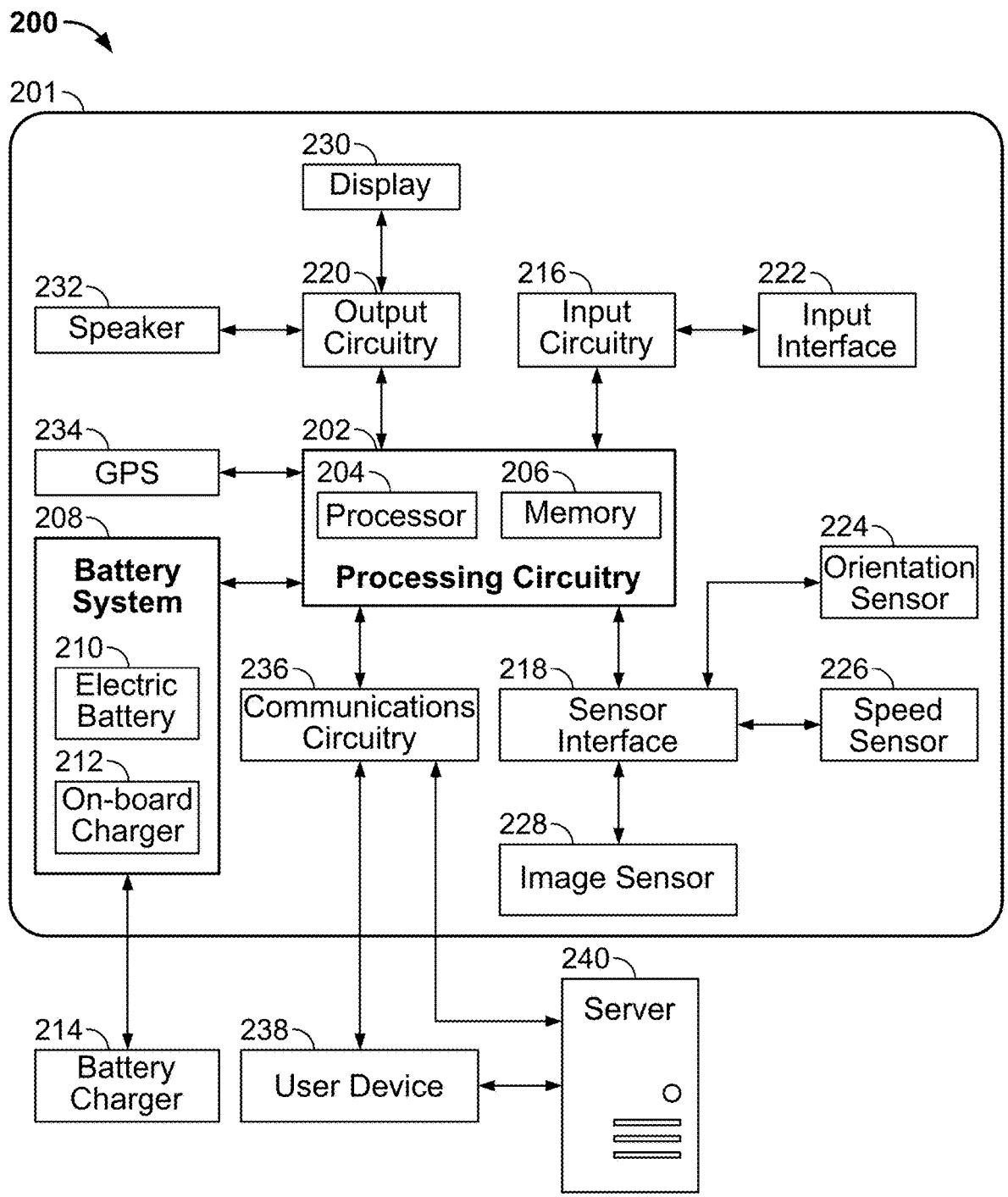
FIG. 2 shows an exemplary block diagram of components of a system of an electric vehicle for presenting icons corresponding to electric charging stations on a map interface, in accordance with some embodiments of the present disclosure.

FIG. 2 shows an exemplary block diagram of components of a system 200 of an electric vehicle 201 for presenting icons corresponding to electric charging stations on a map interface, in accordance with some embodiments of the present disclosure. Vehicle 201 may be a car (e.g., a coupe, a sedan, a truck, an SUV, a bus), a motorcycle, an aircraft (e.g., a drone), a watercraft (e.g., a boat), or any other type of vehicle.

Vehicle 201 may comprise processing circuitry 202 which may comprise processor 204 and memory 206. Processor 204 may comprise a hardware processor, a software processor (e.g., a processor emulated using a virtual machine), or any combination thereof. In some embodiments, processor 204 and memory 206 in combination may be referred to as processing circuitry 202 of vehicle 201. In some embodiments, processor 204 alone may be referred to as processing circuitry 202 of vehicle 201. Memory 206 may comprise hardware elements for non-transitory storage of commands or instructions, that, when executed by processor 204, cause processor 204 to operate vehicle 201 in accordance with embodiments described above and below. Processing circuitry 202 may be communicatively connected to components of vehicle 201 via one or more wires, or via wireless connection.

Processing circuitry 202 may be communicatively connected to battery system 208, which may be configured to provide power to one or more of the components of vehicle 201 during operation. In some embodiments, vehicle 201 may be an electric vehicle or a hybrid electric vehicle. Battery system 208 may comprise electric battery 210, which may include one or more battery modules. In some embodiments, battery 210 may be a 180 kWh battery pack or a 135 kWh battery pack. Battery system 208 may further comprise on-board charger 212 to manage the flow of electricity to electric battery 210 (e.g., to perform AC-DC conversion when battery charger 214 is an AC charger), and any other suitable components. In some embodiments, on-board charger 212 may include connectors for interfacing with battery charger 214. Battery system 208 may be configured to manage charging of battery 210, which may include measuring one or more characteristics of battery 210, identifying if a fault has occurred, providing power to components of vehicle 201, communicating with battery charger 214, any other suitable actions, or any combination thereof. Battery system 208 may include, for example, electrical components (e.g., switches, bus bars, resistors, capacitors), control circuitry (e.g., for controlling suitable electrical components), and measurement equipment (e.g., to measure voltage, current, impedance, frequency, temperature, or another parameter). Battery system 208 may provide charge status information to processing circuitry 202. Charge status information includes, for example, charge level, whether the battery is being charged, charging current, charging voltage, charging mode, and whether a charging fault exists.

In some embodiments, electric vehicle 201 may be plugged, or otherwise connected to, battery charger 214 via a cable (e.g., having a SAE J1772 charging plug, a CCS connector, etc.), having more than one conductor of suitable gauge. Such cable may include conductors for carrying charging current and conductors for transmitting information. It will be understood that any suitable arrangement of leads may be used in accordance with the present disclosure. Battery charger 214 may correspond to, e.g., plug 108 and/or plug 110 of EVSE 105 at electric charging station 103.

Battery charger 214 may be coupled to a power source, e.g., a power transmission grid, a solar panel, a generator, a wind turbine, or another vehicle, and may be configured to provide charging current at a suitable charging voltage to battery 210 of electric vehicle 201. In some embodiments, battery charger 214 may correspond to a charger at charging station 103 which may be a DC station (e.g., DC fast electric charging station, such as, for example, a 26-100 kW DC Fast charging station or a 101-350 kW DC Fast charging station) or AC station (e.g., Level 1 or Level 2). Battery charger 214 may be, for example, a fixed charging station (e.g., a charging station installed in a public location or in a user's home), or a portable charger (e.g., a charger connected to a portable generator, a portable solar panel, or another vehicle). In some embodiments, battery charger 214 may be capable of charging battery 210 at one or more voltages, with one or more current limitations. For example, battery charger 214 may receive information from battery system 208 indicating what voltage, current, or both, electric vehicle 201 may be charged with. Battery charger 214 may provide a charging current that is limited by one or more constraints. For example, electric vehicle 201 may communicate to battery charger 214 what charging current is desired for charging. In a further example, a cable type may have a maximum associated current capacity based on insulation and heat transfer considerations. In some embodiments, battery charger 214 and on-board charger 212, support both the inflow and outflow of current from battery 210 via a coupling. For example, during vehicle to vehicle charging or vehicle to grid power supply, battery charger 214 and/or on-board charger 212 may direct power from battery 210 to a power source coupled to battery charger 214, such as a battery of another vehicle or an electric power grid.

Image sensor 228 (e.g., a camera) may be communicatively coupled to processing circuitry 202 (e.g., by way of sensor interface 218) and positioned at any suitable position in an interior or exterior of vehicle 201. In some embodiments, image sensor 228 may capture images of electric charging stations 103 visited by vehicle 201 to identify favorite charging stations of an operator of vehicle 201. Processing circuitry 202 may be communicatively connected to input interface 222 (e.g., a steering wheel, a touch screen display, buttons, knobs, a microphone or other audio capture device, etc.) via input circuitry 216. In some embodiments, a driver of vehicle 201 may be permitted to select certain settings in connection with the operation of vehicle 201 (e.g., select an icon corresponding to electric charging station 103). In some embodiments, processing circuitry 202 may be communicatively connected to Global Positioning System (GPS) system 234 of vehicle 201, where the driver may interact with the GPS system via input interface 222. GPS system 234 may be in communication with multiple satellites and/or servers 240 to ascertain the vehicle's location and provide navigation directions to processing circuitry 202. As another example, the positioning device operate may operate on terrestrial signals, such as cell phone signals, Wi-Fi signals, or ultra-wideband signals to determine a location of electric vehicle 201. The determined location may be in any suitable form such as a geographic coordinate, a street address, a nearby landmark such as an identification of the nearest charging station or a tagged location associated with the vehicle (e.g., a location of a home of the user stored in memory 206). In some embodiments, processing circuitry 202 uses the determined location to identify whether vehicle 201 is within a threshold range of a tagged location (e.g., is within a certain range from a charging station). In some embodiments, battery system 208 may utilize the determined location to identify whether battery charger 210 is a home charging station or a non-home charging station (e.g., a public charging station, another vehicle, a generator, etc.).

Processing circuitry 202 may be communicatively connected to display 230 and speaker 232 by way of output circuitry 220. Display 230 may be located at a dashboard of vehicle 201 and/or a heads-up display at a windshield of vehicle 201. For example, an interface for GPS system 234 or an interface of an infotainment system may be generated for display, and display 230 may comprise an LCD display, an OLED display, an LED display, or any other type of display. In some embodiments, display 230 may provide a driver with a charger map overlay (e.g., overlaid on a map interface provided by GPS system 234) and detail card information related to EVSEs 105, 107, 109, 111 at electric charging station 103. Speaker 232 may be located at any location within the cabin of vehicle 201, e.g., at the dashboard of vehicle 201, on an interior portion of the vehicle door. In some embodiments, speaker 232 may be configured to provide audio alerts related to electric charging stations 103.

Processing circuitry 202 may be communicatively connected (e.g., by way of sensor interface 218) to orientation sensor 224 which may be an inclinometer, an accelerometer, a tiltmeter, any other pitch sensor, or any combination thereof and may be configured to provide vehicle orientation values (e.g., vehicle's pitch and/or vehicle's roll) to processing circuitry 202. Speed sensor 226 may be one of a speedometer, a GPS sensor, or the like, or any combination thereof, and may be configured to provide a reading of the vehicle's current speed to processing circuitry 202.

In some embodiments, processing circuitry 202 may be in communication (e.g., via communications circuitry 236) with user device 238 (e.g., a mobile device, a computer, a key fob, etc.). Such connection may be wired or wireless. In some embodiments, user device 238 may execute instructions stored in memory to run a map interface application, e.g., to provide parameters or information related to electric charging stations corresponding to icons on a map interface, and/or modify a presentation of icons corresponding to electric charging stations based on a zoom level associated with the map interface. In some embodiments, communications circuitry and/or user device 238 may be in communication with one or more servers 240 (e.g., over a communications network such as, for example, the Internet), which may be configured to provide information related to parameters of EVSE 105, 107, 109, 111 at charging station 103 and/or mapping or GPS information to vehicle 201 and/or user device 238, and provide an updated display based on user inputs.

It should be appreciated that FIG. 2 only shows some of the components of vehicle 201, and it will be understood that vehicle 201 also includes other elements commonly found in vehicles (e.g., electric vehicles), e.g., a motor, brakes, wheels, wheel controls, turn signals, windows, doors, etc.

Figure 3:
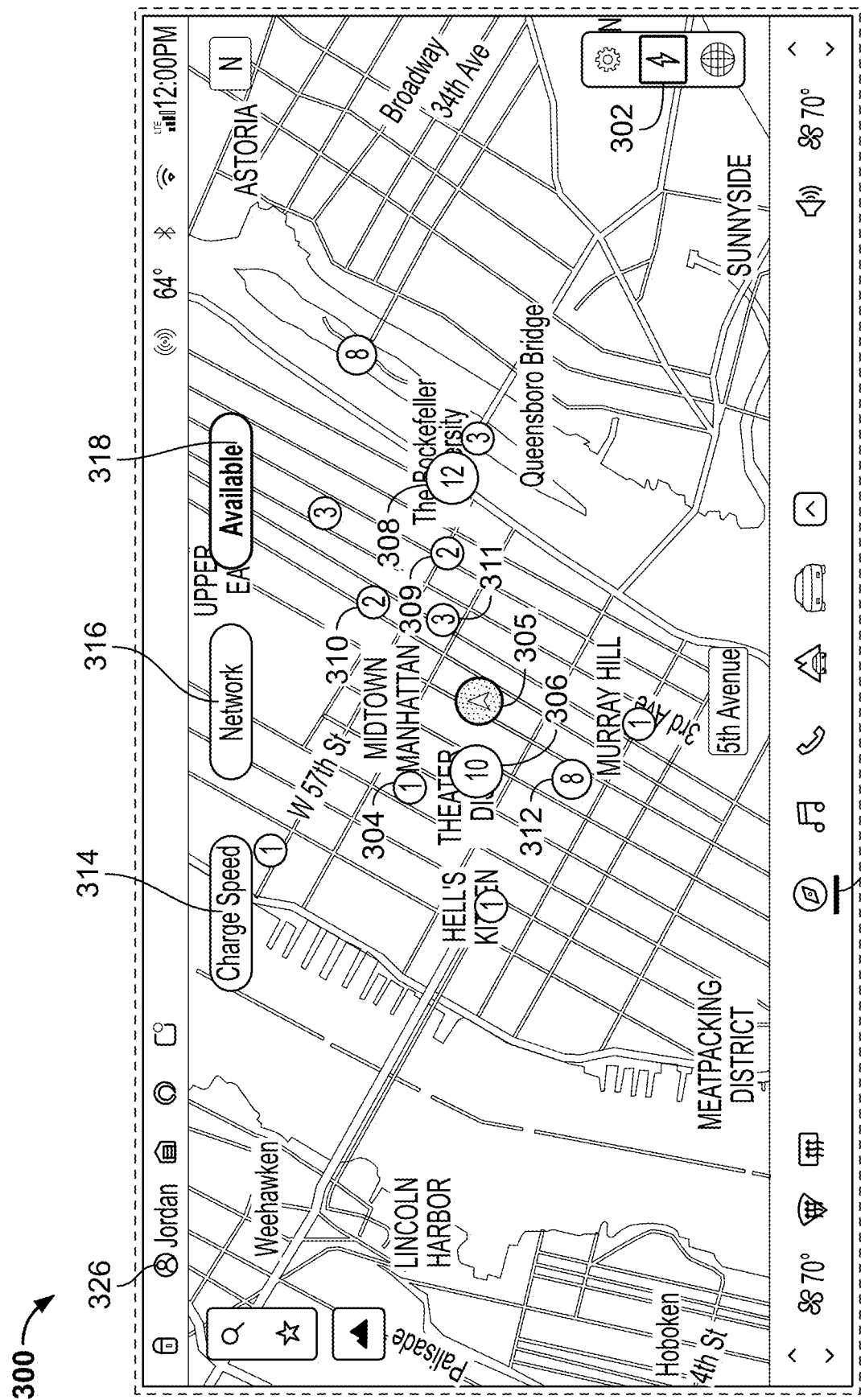
FIG. 3 shows an exemplary map interface for presenting icons corresponding to electric charging stations, in accordance with some embodiments of the present disclosure.

FIG. 3 shows an exemplary map interface 300 presenting icons 304, 306, 309, 310, 311, 312 corresponding to electric charging stations, in accordance with some embodiments of the present disclosure. Map interface 300 may be generated for display, by way of processing circuitry 202 and output circuitry 220, at an in-vehicle infotainment screen of display 230 (e.g., a heads-up display and/or at one or more dashboard displays depicting graphical user interfaces) and/or at a display of a mobile device 238 of a driver 326 of electric vehicle 201. In some embodiments, map interface 300 may be displayed in response to detecting selection of icon 315. Additionally or alternatively, a designated icon, such as, for example, lightning bolt icon 302, may be selectable by a driver of vehicle 201 to toggle on and off a charge overlay onto map interface 300 comprising one or more icons 304, 306, 309, 310, 311, 312 and one or more filters 314, 316, 318. In some embodiments, at certain zoom or magnification levels, a location of an icon or pin on map interface 300 may be indicative of a real-world location of the corresponding electric charging station 103. In some embodiments, indicator 305 may be presented representing a current location of electric vehicle 201 on map interface 300.

Icons 304, 306, 309, 310, 311, 312 may correspond to one or more electric charging stations and may convey information about such corresponding electric charging stations by way of on an appearance of each icon. For example, a size of an icon may be indicative of a number of plugs 108, 110 (either in use or not in use) provided by a particular electric charging station 103, e.g., a smaller icon 304 may indicate that the corresponding electric charging station provides relatively less plugs (e.g., 1-4 plugs); a medium sized icon 312 may indicate that the corresponding electric charging station provides an intermediate number of plugs (e.g., 5-8 plugs); and a larger sized icon 308 may indicate that the corresponding electric charging station provides relatively higher number of plugs (e.g., 9 or more plugs). In some embodiments, a number depicted within icons 304, 306, 309, 310, 311, 312 may correspond to a number of available plugs. For example, the number 12 associated with icon 308 may indicate that currently 12 plugs 108, 110 are not in use and thus available for charging electric vehicle 201. Additionally or alternatively, a color of each icon 304, 306, 309, 310, 311, 312 may be indicative of a charging speed (e.g., a maximum or average charging speed from among each EVSE at the corresponding electric charging station, or a charging speed for available plugs) at the corresponding electric charging station. For example, icon 304 may be associated with a darker color, e.g., dark green, indicating that electric charger 224 at an electric charging station corresponding to icon 304 is associated with a relatively low charging speed (e.g., level 2 at 6-25 kW), whereas icon 312 may be associated with a slightly lighter color, e.g., a slightly lighter green indicating that the electric charging station 103 corresponding to icon 312 is a relatively higher speed charger (e.g., DC fast charging at 26-150 kW). Icon 308 may be associated with a lightest color, e.g., light green, to indicate that the electric charging station 103 corresponding to icon 308 is associated with an even faster charging speed (e.g., DC fast charging at 101-350 kW). While in the example of FIG. 3 a color scheme where darker colors correspond to slower charge speeds and lighter colors correspond to faster charge speeds has been described, it should be appreciated that any color scheme or indicia may be employed to present icons of different charge speeds in a distinguishing manner (e.g., lighter colors may correspond to slower speeds and darker colors may correspond to faster charging speeds, icons may be green to indicate faster charging speeds and icons may be red to indicate slower charging speeds, options may be presented to the user to receive user selection of preferred colors, etc.). It should be appreciated that any combination of attributes of the appearance of icons may be utilized to indicate characteristics of the electric charging stations corresponding to such icons. For example, in some embodiments, a size or color of an icon may be indicative of chargers that are available for use at a particular charging station corresponding to the icon, a size or number associated with an icon may be indicative of the speed of one or more electric chargers at the electric charging station corresponding to the icon, and a color or number may be indicative of a total number of electric chargers at the electric charger station.

Figure 4:
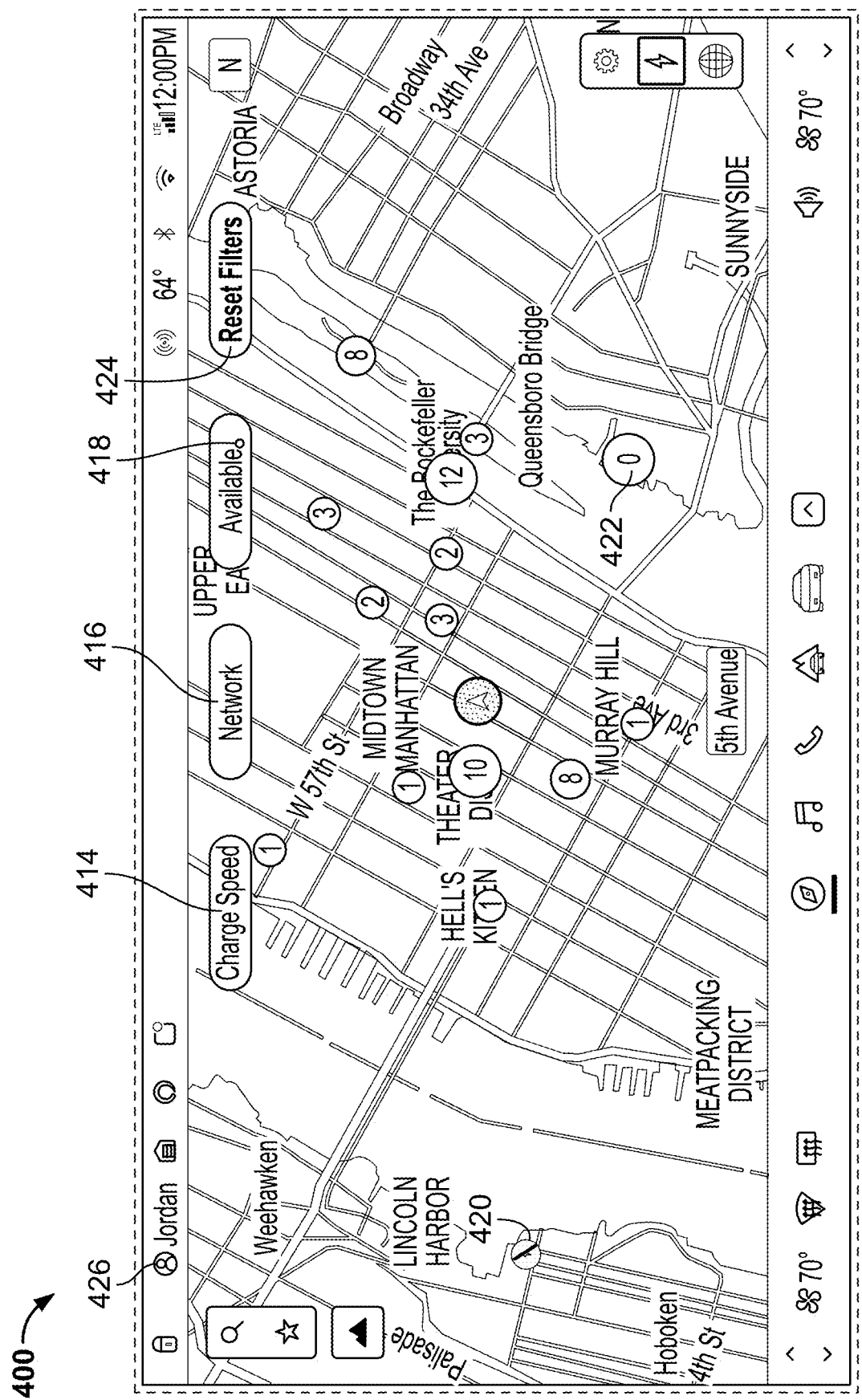
FIG. 4 shows an exemplary map interface for presenting icons corresponding to electric charging stations, in accordance with some embodiments of the present disclosure.

Filters 314, 316, 318 may be selectable by a driver of vehicle 201 to cause map interface 300 to display only icons corresponding to electric charging stations that match the filter criteria of each filter. Selection of available filter 318 may cause charger map overlay, overlaid on map interface 300, to display only icons corresponding to electric charging stations having electric chargers (e.g., ESVEs 105 and/or plugs 108, 110) that are not in use. In some embodiments, available filter option 318 may be toggled on by default, and filter option 318 may be presented in an emphasized manner when selected (e.g., a darker color as compared to the other unselected filter options 314, 316). On the other hand, as shown in FIG. 4, when filter option 418 is not selected, icons 420 and 422 may be displayed, which were not displayed in the example of FIG. 3. For example, icon 420 may depict a lightning bolt icon with a slash mark or any other suitable indicator to indicate to a driver of vehicle 201 that the electric charging station corresponding to icon 420 is not functional (e.g., is currently undergoing maintenance or repairs and is not available for use, or has closed), and icon 422 may be associated with an indication (e.g., the number "0") that no electric chargers are currently available for use (e.g., each charger is currently in use), despite icon 422 being associated with a relatively larger charging station as indicated by its larger size. In some embodiments, an estimate of when a charger might be available may be provided in connection with icon 422, e.g., based on communications from server 240, which may communicate with the electric charging station to determine that a particular vehicle is nearly fully charged and thus the electric charging station may have availability shortly. In some embodiments, map interface 400 including a charge overlay may provide an option 424 to reset filters, which when selected may cause output circuitry 220 to remove any selected filters (or re-select default filters, which may be set automatically and/or which may be modified by the driver of electric vehicle 201 in connection with a profile of user 426).

Figure 5:
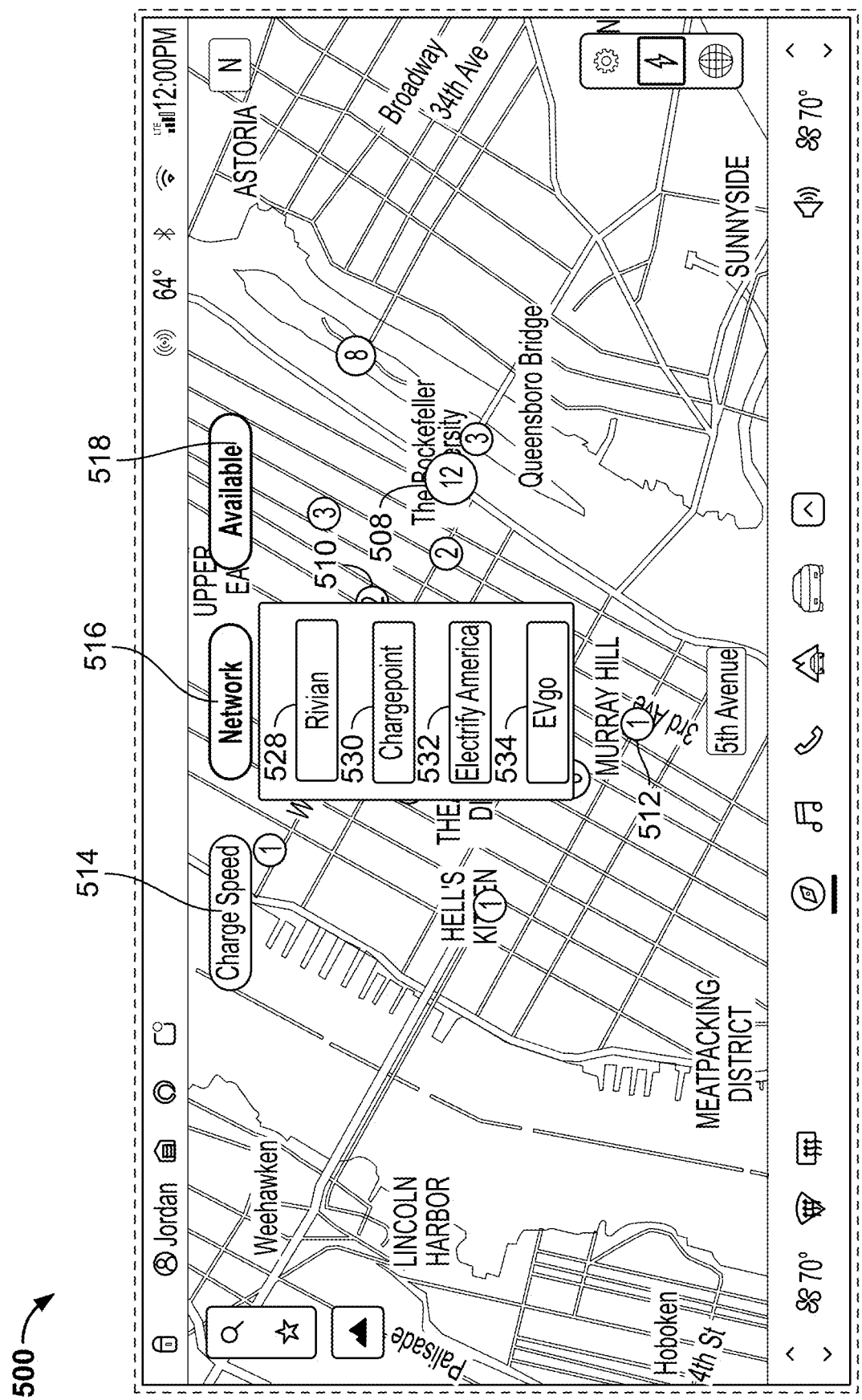
FIG. 5 shows an exemplary map interface for presenting icons corresponding to electric charging stations, in accordance with some embodiments of the present disclosure.

FIG. 5 shows an exemplary map interface 500 for presenting icons corresponding to electric charging stations, in accordance with some embodiments of the present disclosure. Filter option 516 may enable filtering of icons, e.g., icons 508, 510, 512, based on a provider or manufacturer of the electric charging station corresponding to the icon and identified by processing circuitry 202. For example, selection of option 528 may cause only electric charging stations corresponding to Rivian to be displayed, while selection of options 530, 532, 534 may cause only electric charging stations corresponding to ChargePoint, Electrify America, and EVgo, respectively, to be displayed. In some embodiments, multiple filter options from among filter options 514, 516, 518 may be selected, to cause only icons meeting each selected filter criteria to be presented. In the example of FIG. 5, each of filter option 516 and 518 are selected, and thus processing circuitry 202 and/or output circuitry 220 may cause display of only the icons that are both available for use and are provided by one of the selected providers 528, 530, 532, 534. In some embodiments, each charging station 103 may correspond to a single provider or manufacturer, e.g., Rivian or ChargePoint. Alternatively, charging station 103 may comprise EVSEs 105, 107, 109, 111 from at least two different providers or manufacturers.

Figure 6:
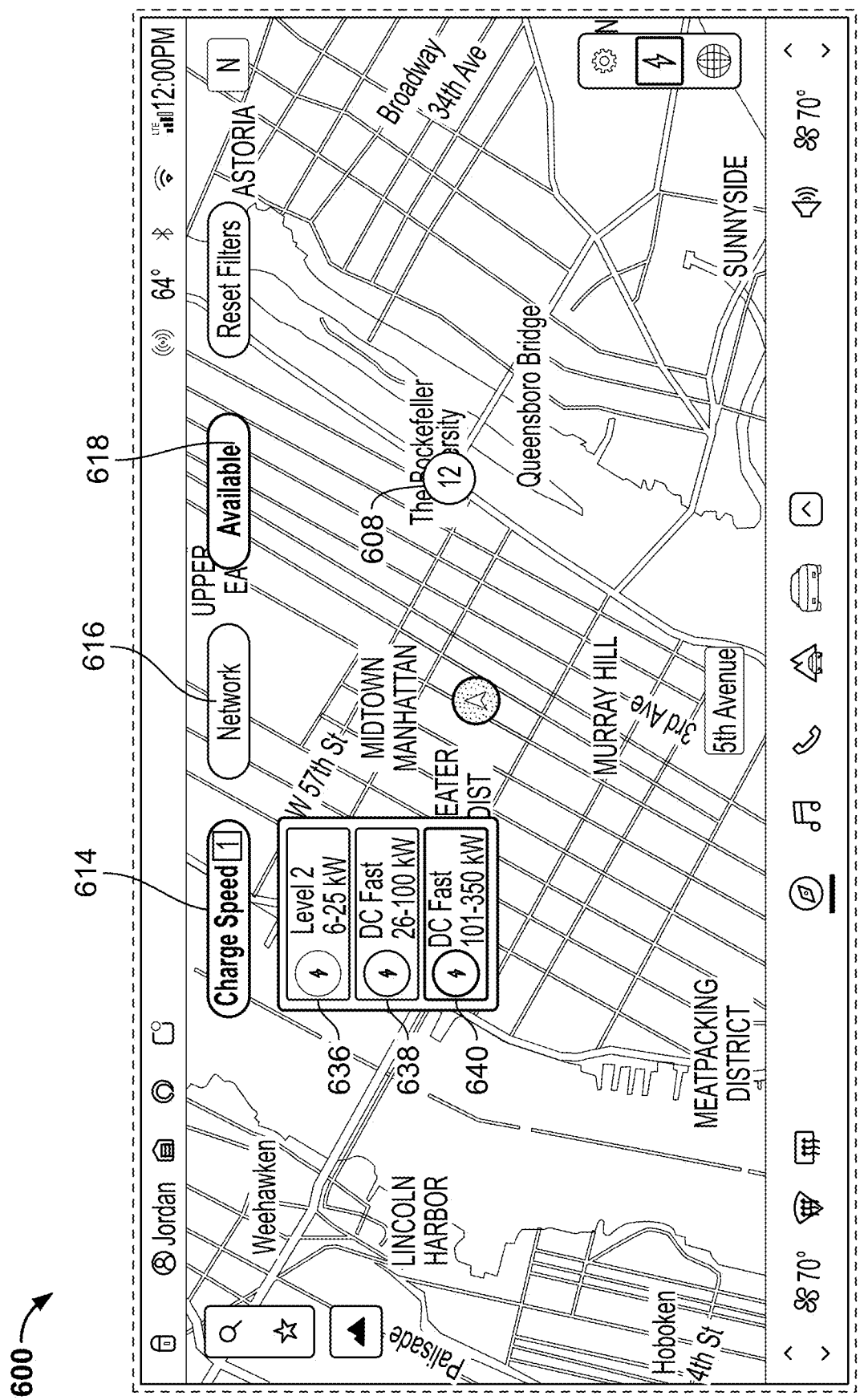
FIG. 6 shows an exemplary map interface for presenting icons corresponding to electric charging stations, in accordance with some embodiments of the present disclosure.

FIG. 6 shows an exemplary map interface 600 for presenting icons corresponding to electric charging stations, in accordance with some embodiments of the present disclosure. Filter option 614 may be used to filter icons based on whether electric charging stations 103 corresponding to icons 304, 306, 309, 310, 311, 312 meet the specified charge speed criteria. For example, filter option 614 may enable display of icons corresponding to one or more of a level 2 charging speed 636 (e.g., 6-25 kW), DC Fast charging speed 638 (e.g., 26-100 kW), and DC Fast charging speed 640 (e.g., 101-350 kW). In the example of FIG. 6, option 640 is selected, and the only icon corresponding to an electric charging station meeting this criteria, icon 608, may be displayed by way of the charge overlay of map interface 600. In some embodiments, an indication of a number of selected filters may be displayed to the user (e.g., the number "1" may be displayed within a predefined proximity of filter option 614 to indicate that option 640 is selected). In some embodiments, a number of electric charging stations matching the specified criteria may be indicated in a proximity of option 614, 616, 618, e.g., the number "1" may be displayed within a predefined proximity of filter option 614. In some embodiments, charge overlay of map interface 600 may emphasize certain electric charging stations 103 that are frequently visited by a user, or electric charging stations 103 that processing circuitry 202 or user device 238 has received an indication is a favorite electric charging station 103 of the driver of electric vehicle 201.

Figure 7:
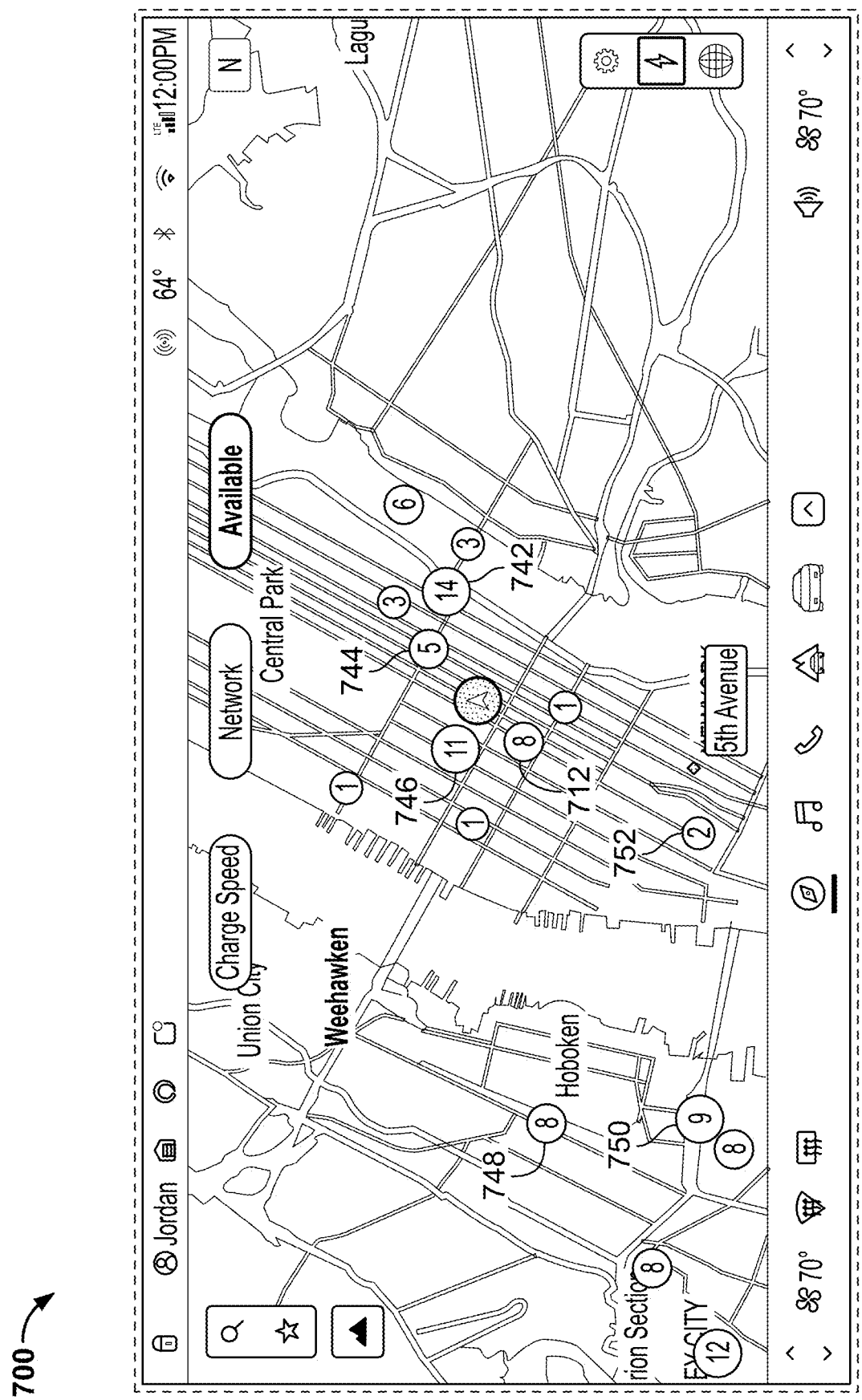
FIG. 7 shows an exemplary map interface for presenting icons corresponding to electric charging stations in a zoomed-out view, in accordance with some embodiments of the present disclosure.

FIG. 7 shows an exemplary map interface 700 for presenting icons corresponding to electric charging stations in a zoomed-out view, in accordance with some embodiments of the present disclosure. Input interface 222 or user device 238 may receive user input (e.g., a user gestures, such as a user contacting a touch screen of display 230 or a display of user device 238 with two fingers or other input mechanism and performing a pinch gesture to bring his or her fingers closer together, or, a tap of a zoom command, voice input, or any other suitable input) to zoom out of a current display of map interface 300 of FIG. 3. For example, map interface 300 may correspond to a zoom level at which a first plurality of icons 304, 306, 309, 310, 311, 312 are displayed at respective positions.

In some embodiments, map interface 700 may be generated based on tiles-based scheme, e.g., the map may be comprised of a set of square map tiles, where the number of displayed tiles varies based on a zoom level that is selected, and each tile may be assigned suitable coordinates. For example, the entire map of the world at a zoom level of 0 may be rendered as a single tile of a predefined number of pixels (e.g., 256×256 pixels), where a global view of the continents is depicted. A zoom level of 1 may correspond to the map interface (e.g., the entire map of the world) being divided into a predefined number of tiles (e.g., a 2×2 grid of tiles, having coordinates of (0,0), (1,0), (0,1), (1,1) where an upper left corner may correspond to the origin) where each tile is a predefined number of pixels (e.g., 256×256 pixels). That is, for each zoom level, the number of tiles may double in each direction (e.g., zoom level 3 may be an 8×8 grid of tiles). In some embodiments, map interface 300 may correspond to a zoom level that is suitable to view details of street information (e.g., W 57$^{th}$ St, Midtown Manhattan as shown in FIG. 3), such as, for example, a zoom level of 10 corresponding to a predefined number of tiles (e.g., a grid of 1024×1024 tiles representing the entire world, to enable zooming to a sufficient level of detail) each corresponding to the predefined number of pixels (e.g., 256×256 pixels).

In response to receiving a zoom command (e.g., to a zoom-out command to zoom out from a zoom level of 10 to a zoom level of 9, or a zoom-in command to zoom in from a zoom level of 10 to a zoom level of 11) processing circuitry 202 and/or output circuitry 202 may generate for presentation a second plurality of icons 712, 742, 744, 746 at map interface 700 based on the zoom command (e.g., zoom-out command) to modify the zoom level of map interface 300. Processing circuitry 202 and/or output circuitry 220 may generate combined icon 742 by collapsing together icons 308 and 309 of map interface 300, combined icon 744 may be generated by collapsing together icons 310 and 311 of map interface 300, and combined icon 746 may be generated by collapsing together icons 304 and 306.

In some embodiments, a collapsed together icon may provide a combined number of available chargers and be depicted in a color of a faster charging speed from among the icons used to generate the combined icon. For example, where icons 308 and 309 are used to generate combined icon 742, combined icon 742 may be depicted in the lighter green color of icon 308 (e.g., indicative of DC fast charging speed 640) rather than the darker green color of icon 309 (e.g., indicative of the slower Level 2 charging speed 636), and combined icon 742 may indicate the number 14 to convey that 14 electric chargers are available for use within a predefined area of each of icon 308 and 309. In some embodiments, if two or more icons are collapsed or clustered together, and processing circuitry 202 determines that the combined number of electric chargers for such collapsed together icons exceeds a threshold (e.g., 9 or more electric chargers), processing circuitry may cause the combined icon to be generated for display as a larger size icon (even if none of the two or more icons on their own had enough electric chargers to justify being presented in the larger size). In some embodiments, icons 308 and 309 may be collapsed together when the received zoom command causes such icons to come within a predefined distance from each other (e.g., in pixels within map interface 700, or real-world distance such as in miles or kilometers).

In some embodiments, certain icons, such as, for example, icon 712 which may correspond to icon 312, may be retained at map interface 700, e.g., without being collapsed together with other icons. Processing circuitry 202 may determine that icon 712 should not be collapsed together with other icons upon determining that no other icons are within a predefined vicinity (e.g., by pixels within map interface 700 or real-world distance) of icon 712, although the location of icon 712 in map interface 700 may be adjusted from the location of icon 312 in map interface 300 to account for the zoomed out view encompassing a larger area. In some embodiments, certain icons 748, 750, 752 may be presented in the zoomed out view that were not presented in map interface 700, since the zoomed out view of map interface 700 encompasses more area. In some embodiments, if processing circuitry 202 receives a zoom in command (e.g., to revert from the zoom level of map interface 700 to the zoom level of map interface 300), processing circuitry may cause the displayed icons to revert to icons 304, 306, 308, 309, 310, 311, 312 of map interface 300, and collapsed icons 742, 744, 746 may be pulled apart to revert to the separate icons of map interface 300, e.g., combined icon 742 may be replaced with icons 308 and 309 of map interface 300. In some embodiments, upon receiving a selection of combined icon 742, processing circuitry 202 may cause combined icon 742 to split up and revert to icons 308 and 309 (e.g., revert to the view of map interface 300), to enable selection of one or icons 308 and 309 to present further parameters or details associated with the selected icon.

Figure 8:
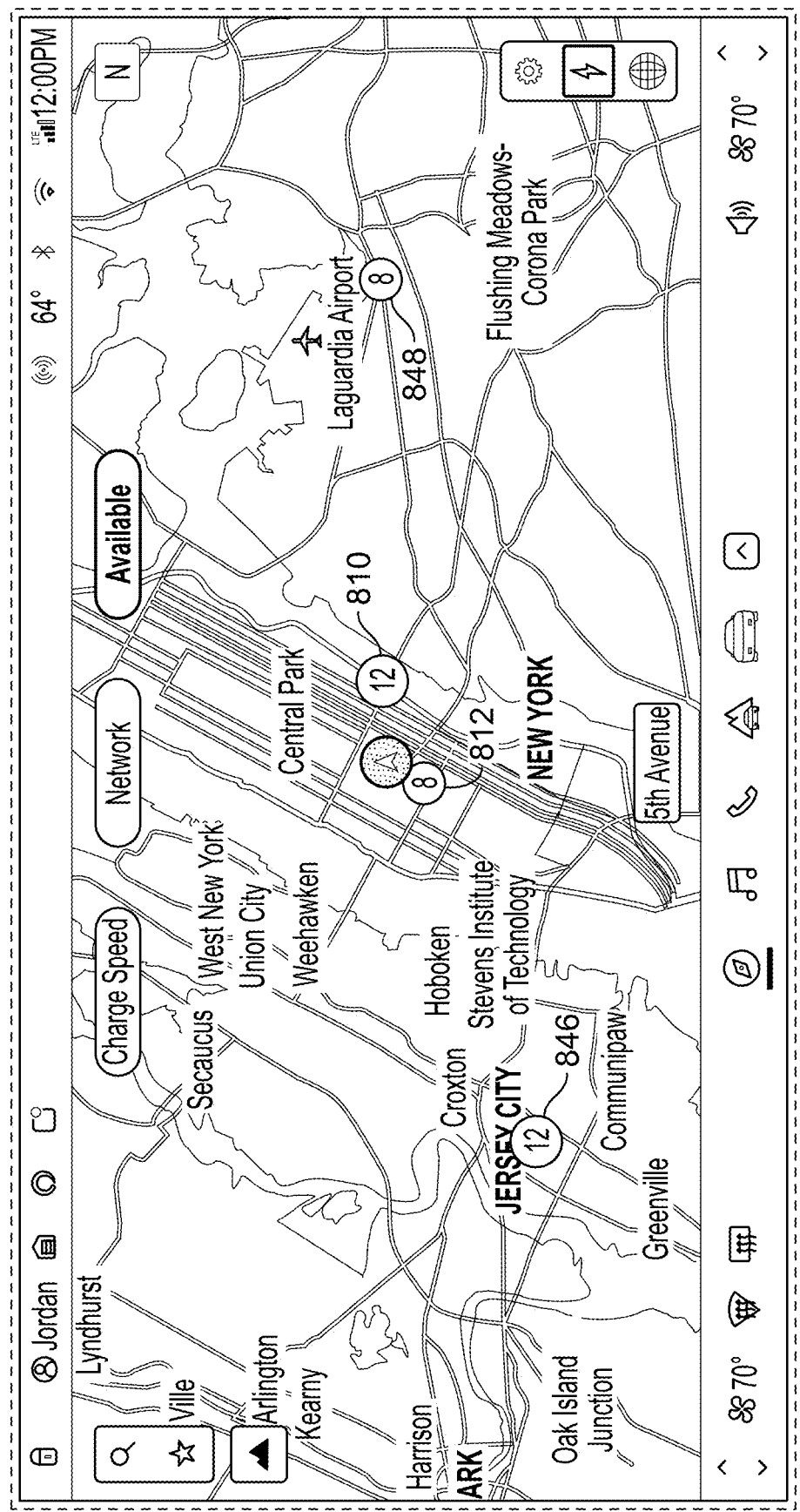
FIG. 8 shows an exemplary map interface for presenting icons corresponding to electric charging stations in a zoomed-out view, in accordance with some embodiments of the present disclosure.

FIG. 8 shows an exemplary map interface 800 for presenting icons corresponding to electric charging stations in a zoomed-out view, in accordance with some embodiments of the present disclosure. Processing circuitry 202 and/or output circuitry 220 of vehicle 201 and/or user device 238 may receive user input to further zoom-out from the view of map interface 700. For example, map interface 700 may correspond to a zoom level of 9, and the received user input may request to further zoom-out (e.g., to a zoom level of 8) associated with map interface 800. In response to detecting the zoom-out command, processing circuitry 202 may identify a subset of the plurality of electric charging stations (e.g., electric charging stations corresponding to icons of map interface 300 and/or icons of map interface 700) having a charging speed above a threshold charging speed (e.g., DC Fast charging speed 638). For example, processing circuitry 202 may determine that each of icon 810 (corresponding to icon 310), icon 812 (corresponding to icon 312), icon 846 and icon 848 correspond to an electric charging station is associated with a charging speed that exceeds the threshold charging speed (e.g., DC Fast charging speed 638). Processing circuitry 202 and/or output circuitry 220 of electric vehicle 201 may generate for presentation at display 230 a second plurality of icons on the zoomed-out view of map interface 800 corresponding to the identified subset of the plurality of electric charging stations (e.g., the electric charging stations corresponding to icons 810, 812, 846 and 848) while removing icons corresponding to charging stations having an electric charging speed below the threshold charging speed (e.g., removing icons 304, 306, 309, 311). Such actions may be performed based on the inference that if a user is zooming out sufficiently far (e.g., to a state level of New York or New Jersey), the user is likely interested in a relatively long road trip, and thus level 2 AC chargers with slower electric charging speeds may not be as useful as electric charging stations with faster charging speeds. Thus, processing circuitry 202 may declutter map interface 800 by only presenting icons corresponding to fast charging electric chargers that are likely to be of interest and more useful for a user that is interested in such a long road trip (and a shorter amount of charging time to reach a charging level that is suitable for such a trip).

In some embodiments, the zoomed-out view of map interface 800 comprising the identified subset of electric chargers 810, 812 may be generated for presentation in response to determining that the modified zoom level (e.g., zoom level 8) is below a predetermined zoom threshold (e.g., zoom level 9). For example, until a certain zoom level is reached, it may not be desirable to present only fast electric chargers because it may be determined that a driver might still be interested in a shorter trip where a slower charging speed electric charger may suffice. In some embodiments, if electric charging station 103 comprises EVSEs 105, 107, 109, 111 having different electric charging speeds, electric charging station 103 may be deemed to exceed the charging speed threshold if at least one EVSE exceeds the speed threshold. Additionally or alternatively, if electric charging station 103 is identified as having an EVSE that exceeds the threshold speed, but such EVSE is not available, such electric charging station may not be displayed at map interface 800 or may be displayed with an indication that such electric charging station includes DC fast chargers but none are currently available for use.

Figure 9A:
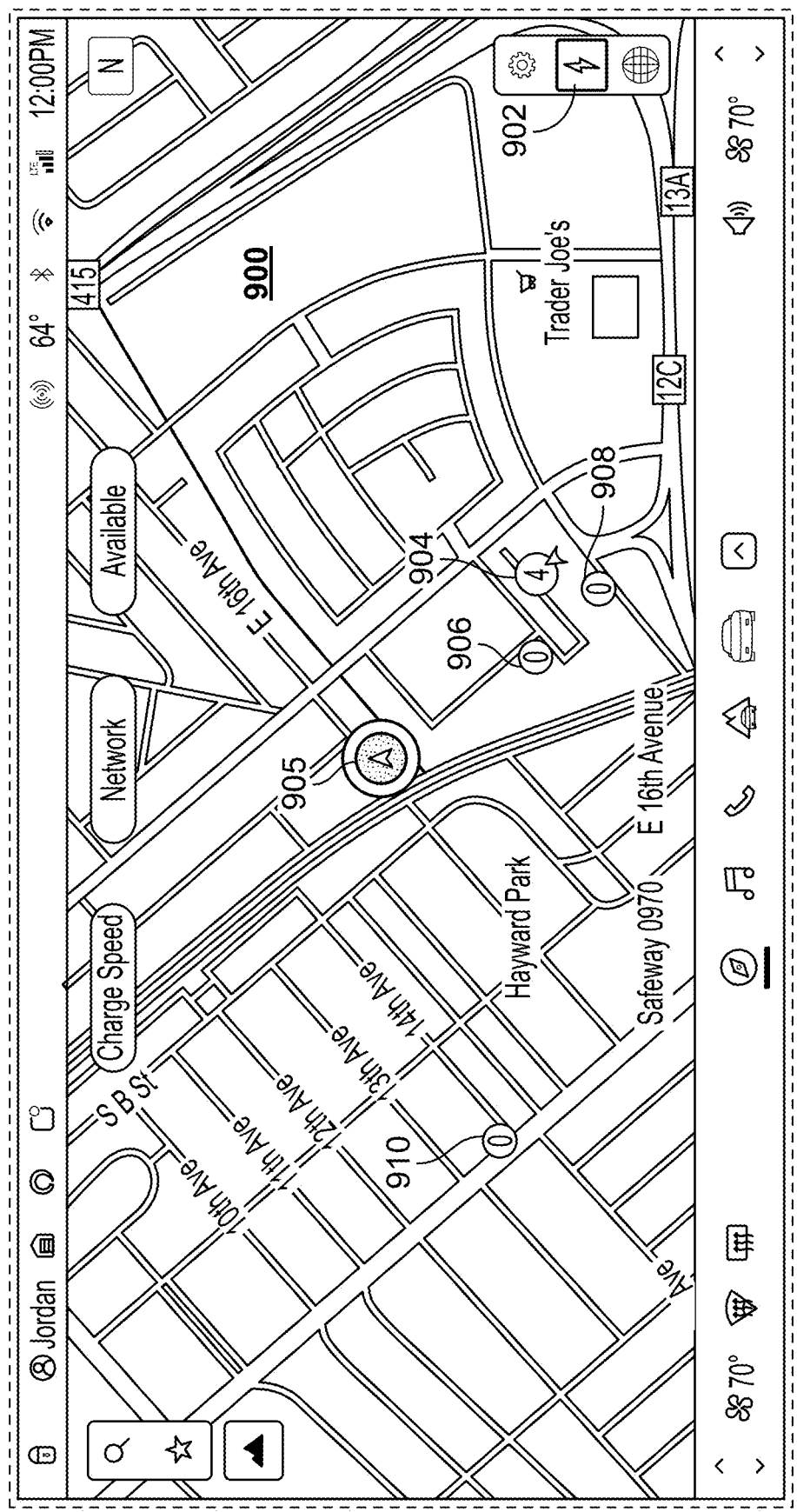
FIGS. 9A-9C show exemplary map interfaces for presenting information related to homogenous electric charging stations, in accordance with some embodiments of the present disclosure.
Figure 9B:
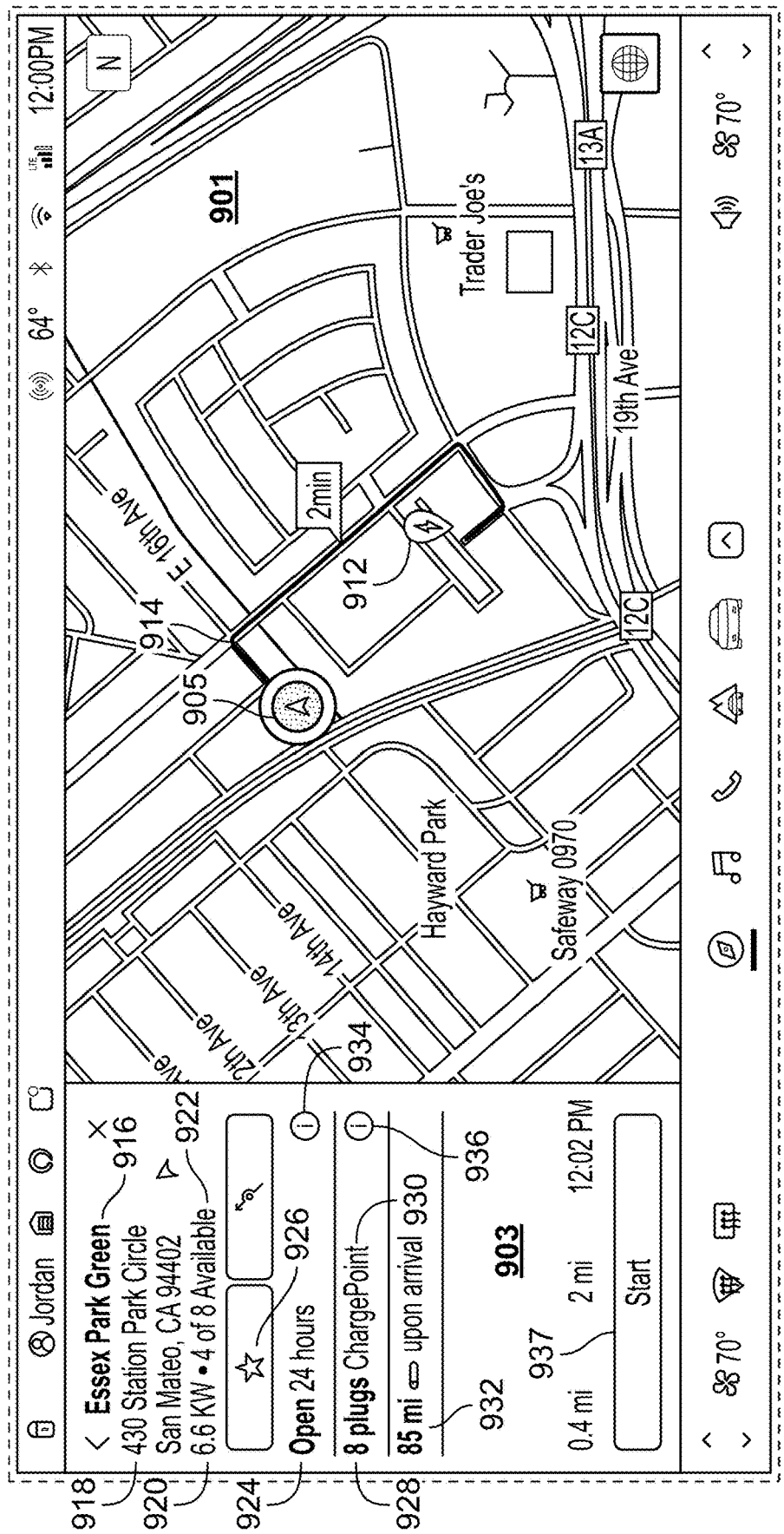
Figure 9C:
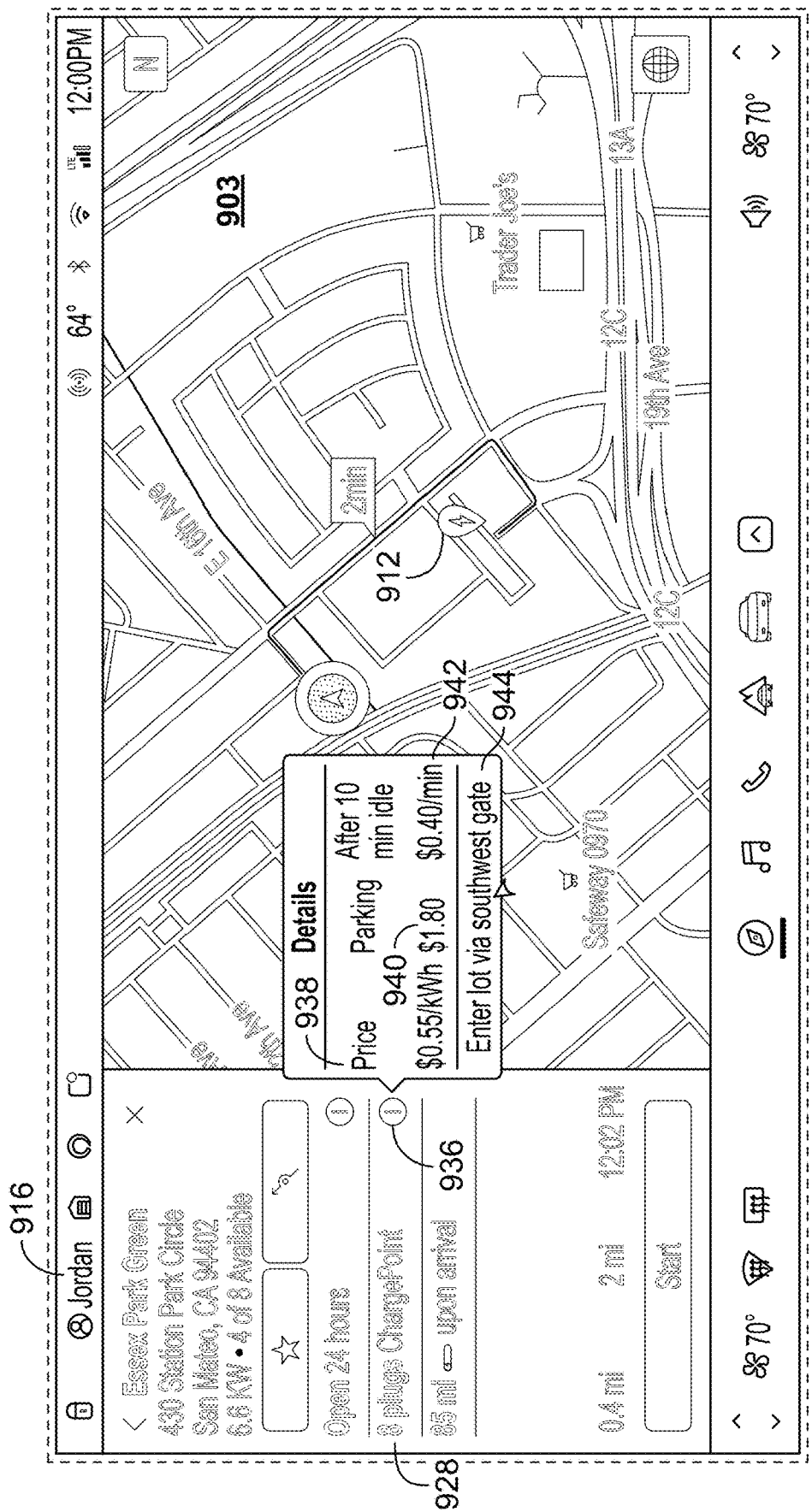

FIGS. 9A-9C shows an exemplary map interface 900 for presenting information related to homogenous electric charging stations, in accordance with some embodiments of the present disclosure. In response to detecting selection of icon 902, map interface 900 may be caused by processing circuitry 202 and/or output circuitry 220 to generate for display icons 904, 906, 908, 910 corresponding to respective one or more electric charging stations, and icon 905 corresponding to a current location of electric vehicle 201, which may be determined by GPS 234 and/or a GPS of user device 238. In response to detecting selection of, e.g., icon 904, processing circuitry 202 and/or output circuitry 220 may generate for display map interface 901 and detail card 903 of FIG. 9B.

Map interface 901 may comprise indicator 905 of the location of vehicle 201 and a suggested route 914 to icon 912 corresponding to the electric charging station associated with selected icon 904. In some embodiments, processing circuitry 202 may generate for display detail card 903 by identifying parameters of electric charging station 912, e.g., a name 916, an address 918, a power level 920, a number of available electric chargers 922, hours of operation 924, number of total plugs 928, electric charger provider 930, estimated range upon arrival 932, etc. Based on the identified parameters, processing circuitry 202 may determine whether there are two or more categories of the electric chargers of electric charging station 912. In the example, of FIG. 9, processing circuitry 202 may determine that there is a single category of electric chargers based on, e.g., each plug 928 being of the same provider 930, having the same hours of operation 924, and having the same power level 920. In such instance, processing circuitry and/or output circuitry 220 may generate for display parameters common to each plug 928 to indicate to a driver of electric vehicle 201 that each electric charger is equivalent for the purposes of charging vehicle 201. Thus, an operator of vehicle 201 may determine, without having to select further options at map interface 901, that electric charging station 912 is a homogeneous station and any available electric charger is suitable for providing a similar charging experience. In some embodiments, input circuitry 216 may detect selection 926 indicating electric charging station 912 is a favorite of the operator 916 of vehicle 201, and such favorited electric charging station 912 may be emphasized to operator 916 in future presentations of map interface 901. In some embodiments, input circuitry 216 may detect selection of icon 937 to begin receiving navigation instructions to electric charging station 912.

In some embodiments, input circuitry 216 may detect a user interaction with information option 934 or information option 936. For example, input circuitry 216 may detect that operator 916 of electric vehicle 201 hovered his or her finger or a cursor over information icon 936, and in response to detecting such input, processing circuitry 202 may generate for presentation additional details for electric charging station 912, such as, for example, parameters applicable to each plug 928, e.g., price information 938, parking information 940, additional price information 942 and notes 944, as shown at map interface 903 of FIG. 9C.

Figure 10A:
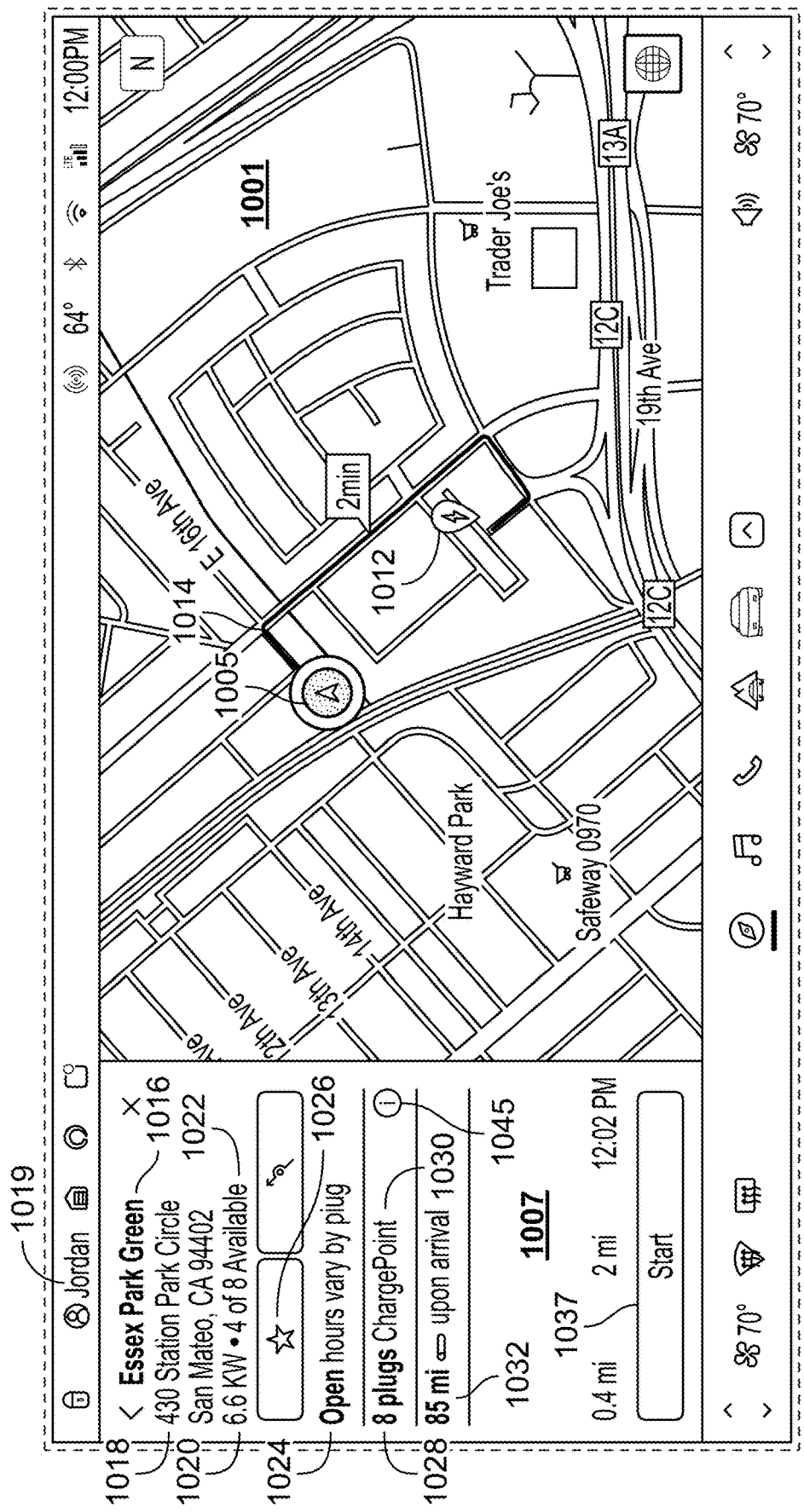
FIGS. 10A-10D show exemplary map interfaces for presenting information related to heterogenous electric charging stations, in accordance with some embodiments of the present disclosure.

FIGS. 10A-10D show exemplary map interfaces for presenting information related to heterogenous electric charging stations, in accordance with some embodiments of the present disclosure. As shown in FIG. 10A, map interface 1001 and detail card 1007 may be presented in response to processing circuitry 202 detecting selection of an icon, e.g., icon 904 of FIG. 9. In presenting map interface 1001, processing circuitry 202 may determine respective parameters of electric charging station 1012 corresponding to the selected icon. For example, processing circuitry 202 may determine that there are two or more categories of electric chargers based on at least two plugs 1028 having different power levels 1020 and/or different hours of operation 1024 from each other. In some embodiments, processing circuitry may determine parameters of electric charging station 1012 by requesting information from server 240 via communications circuitry 236.

Parameters for electric charging station 1012 presented at detail card 1008 may include, for example, power level 1020, availability information 1022, hours of operation 1024, total number of plugs 1028, and electric charger provider 1030. One or more of such parameters may be presented in a manner to indicate variation amongst electric chargers 1028 for the particular parameter. For example, hours 1024 may indicate "hours vary by plug" suggesting that different plugs at electric charging station 1012 may have different hours of variation, and power level 1020 may indicate "6.6 kW max", e.g., corresponding to a max level from among the multiple plugs 1028 and suggesting that at least some plugs may be associated with a power level below the max. Map interface 1001 may comprise detail card 1007 which may include an indication of a name 1016 of electric charger station 1012 and an address 1018 of electric charging station 1012. In some embodiments, processing circuitry 202 and/or input circuitry 216 may detect selection of icon 1037 to begin providing navigation instructions via route 1014 from a current location of user to electric charging station 1012. In some embodiments, option 1026 may be selectable to indicate that electric charging station 1012 is a favorite charging station, and may be emphasized in the future to user 1019.

Figure 10B:
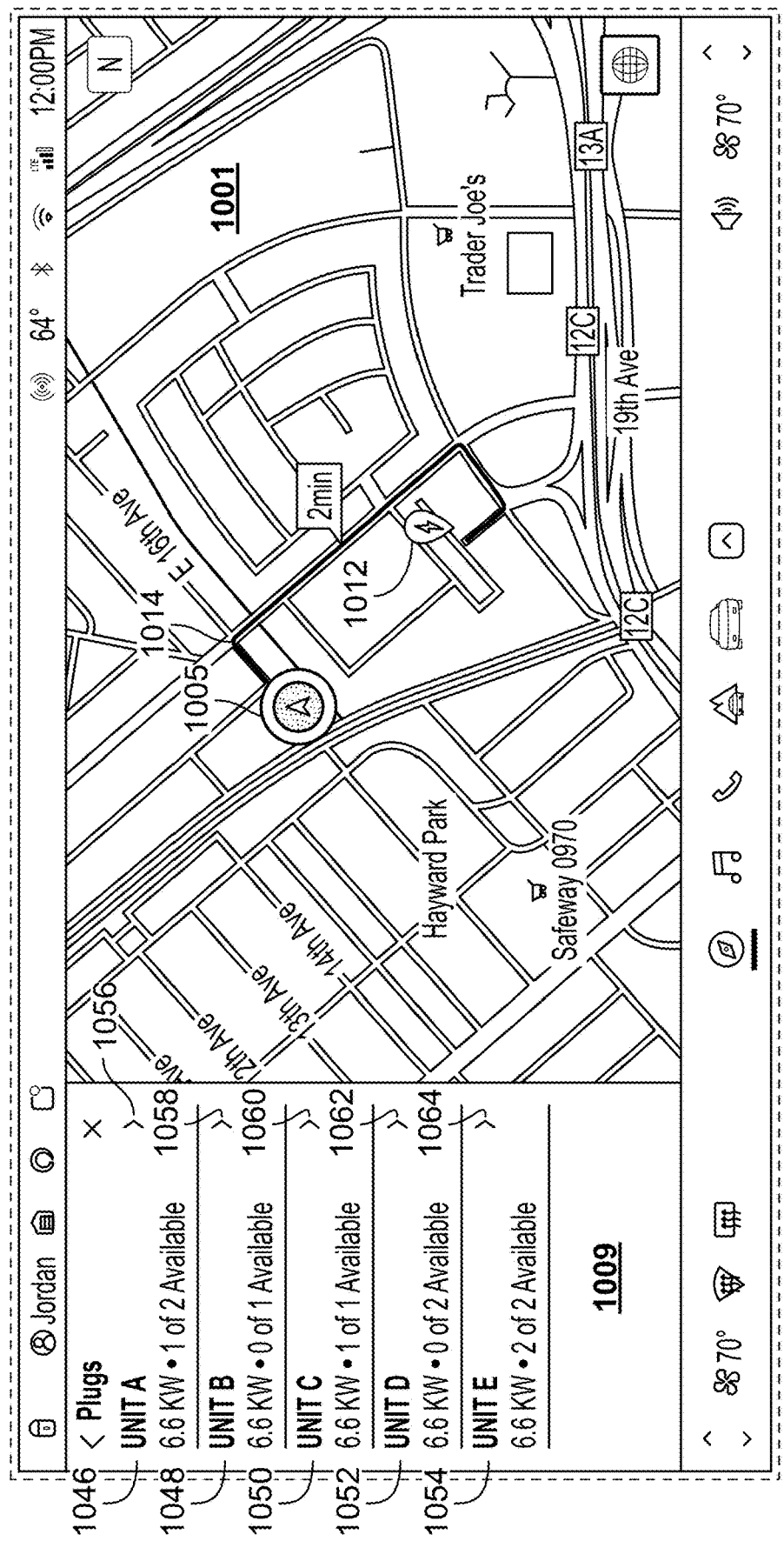
Figure 10C:
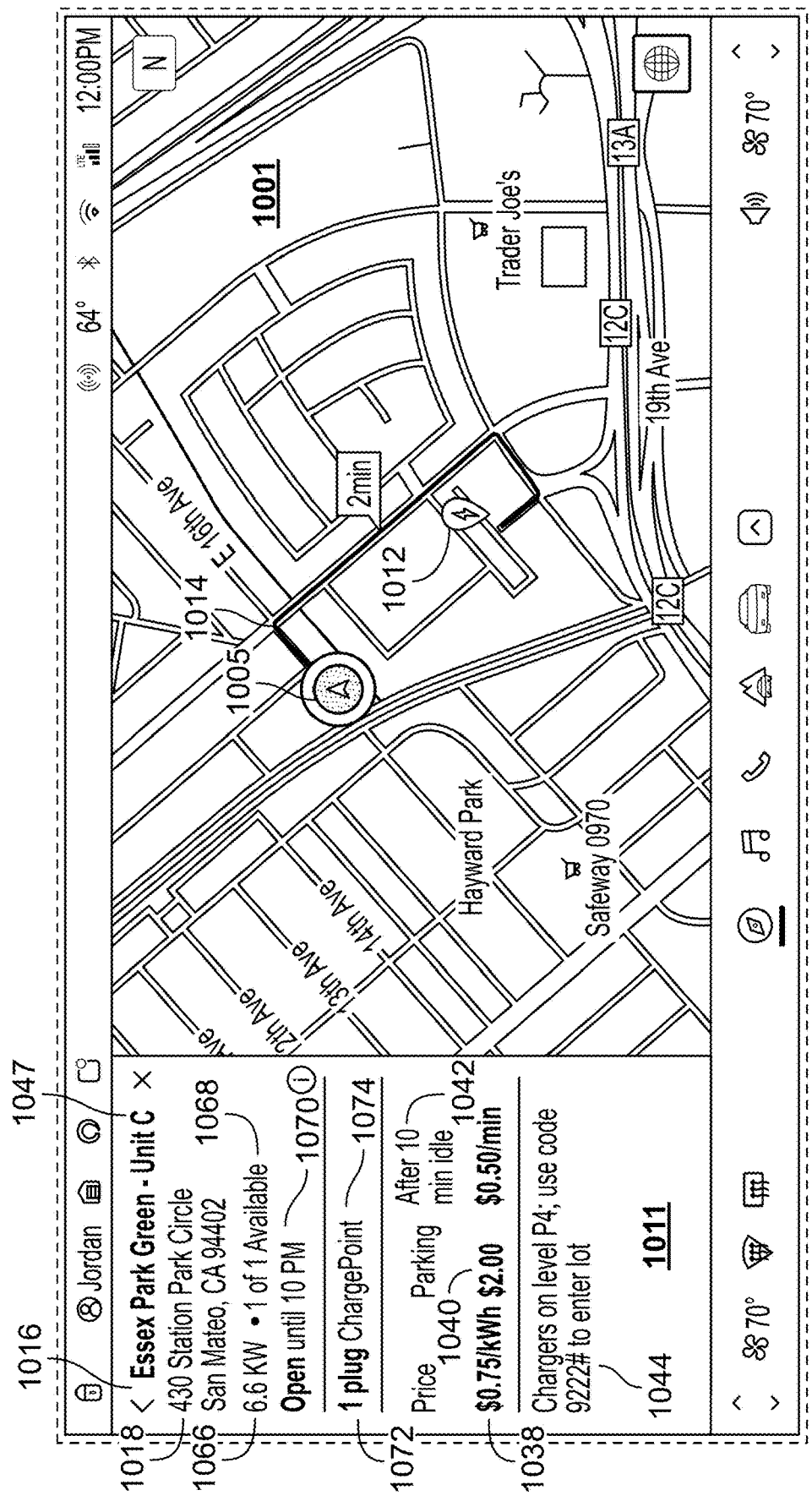

In some embodiments, option 1045 may be selectable to cause display of map interface 1001 and intermediate summary screen 1009 of FIG. 10B. Intermediate summary screen 1009 may provide respective brief summaries of parameters related to EVSE 1046, 1048, 1050, 1052, 1054 of electric charging station 1012. For example, information related to EVSE 1046 may be provided, such as, for example, an indication of the name of the EVSE (e.g., "Unit A"), a power level of the plugs of EVSE 1046, and a number of plugs that are available at EVSE 1046 from among a total number of plugs at EVSE 1046. Similar types of information may be presented for each of respective EVSEs 1048, 1050, 1052, 1054 of electric charging station 1012. In some embodiments, each of EVSEs 1046, 1048, 1050, 1052, 1054 may correspond to respective selectable options 1056, 1058, 1060, 1062, 1064, where selection of one of such options causes a more detailed view of the EVSE associated with the selected option. For example, detail card 1011 of FIG. 10C may be generated for display in response to processing circuitry 202 detecting selection of option 1060.

Detail card 1011 may present information related to selected EVSE 1050, e.g., a name 1016 of electric charging station 1012, a name 1047 of EVSE 1050, an address 1018 of electric charging station 1012, a power level 1066 of EVSE 1050, availability of plugs information 1068 of EVSE 1050, hours of operation 1070 of EVSE 1050, total number of plugs 1072 at EVSE 1050, electric charger provider 1074 of EVSE 1050, price information 1038, parking price information 1040, additional price information 1042, and notes 1044. In some embodiments, detail card 1011 may depict an icon indicative of a location of EVSE 1050 within electric charger station 1012.

Figure 10D:
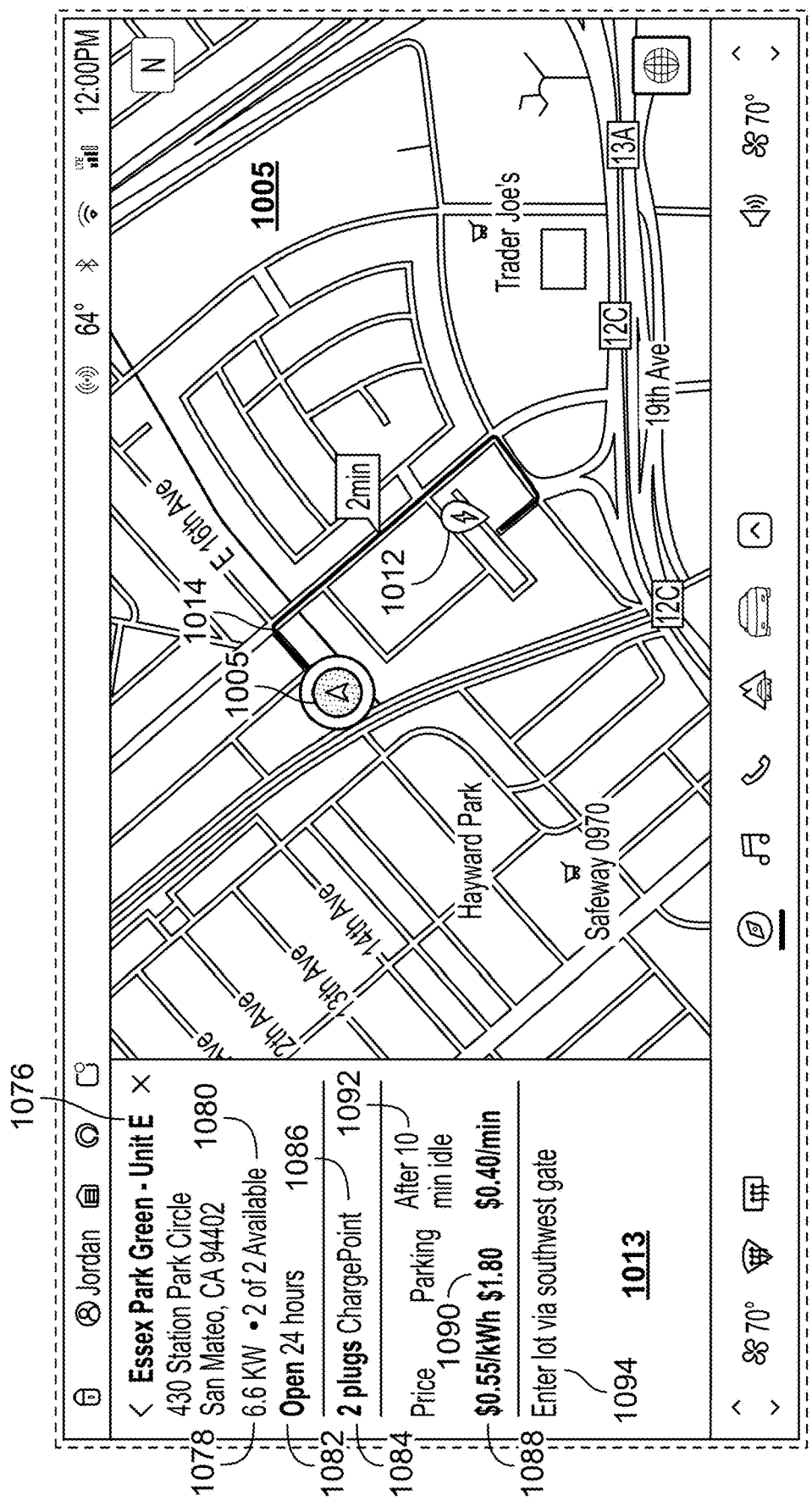

Map interface 1005 comprising detail card 1013 of FIG. 10D may be generated for presentation by processing circuitry 202 in response to detecting selection of option 1064 associated with EVSE 1054 of FIG. 10B. Map interface 1005 may comprise various parameters related to electric charging station 1012, e.g., name 1076 (e.g., "Unit E"), power level 1078, availability information 1080, hours of operation 1082, number of plugs 1084, provider information 1086, price information 1088, parking information 1090, additional price information 1092, and notes 1094. At least one of such parameters may be different than the parameters specified in connection with detail card 1011 corresponding to EVSE 1050. For example, hours of operation 1082 of EVSE 1054 differs from hours of operation 1070 of EVSE 1050, price and parking information 1088, 1090, 1092 of EVSE 1054 differs from price and parking information 1038, 1040, 1042 of EVSE 1050, and notes 1094 of EVSE 1054 differs from notes 1044 of EVSE 1050. Such features may provide a driver of electric vehicle 201 the ability to view an initial screen of map interface 1001 comprising detail card 1007 indicative of electric chargers having differing parameters, subsequently drill down to an intermediate summary screen 1009 providing a brief summary for each EVSE of the electric charging station, and further drill down to obtain detailed parameter information for individual EVSEs, such as, for example, at detail card 1011 of FIG. 10C.

Figure 11A:
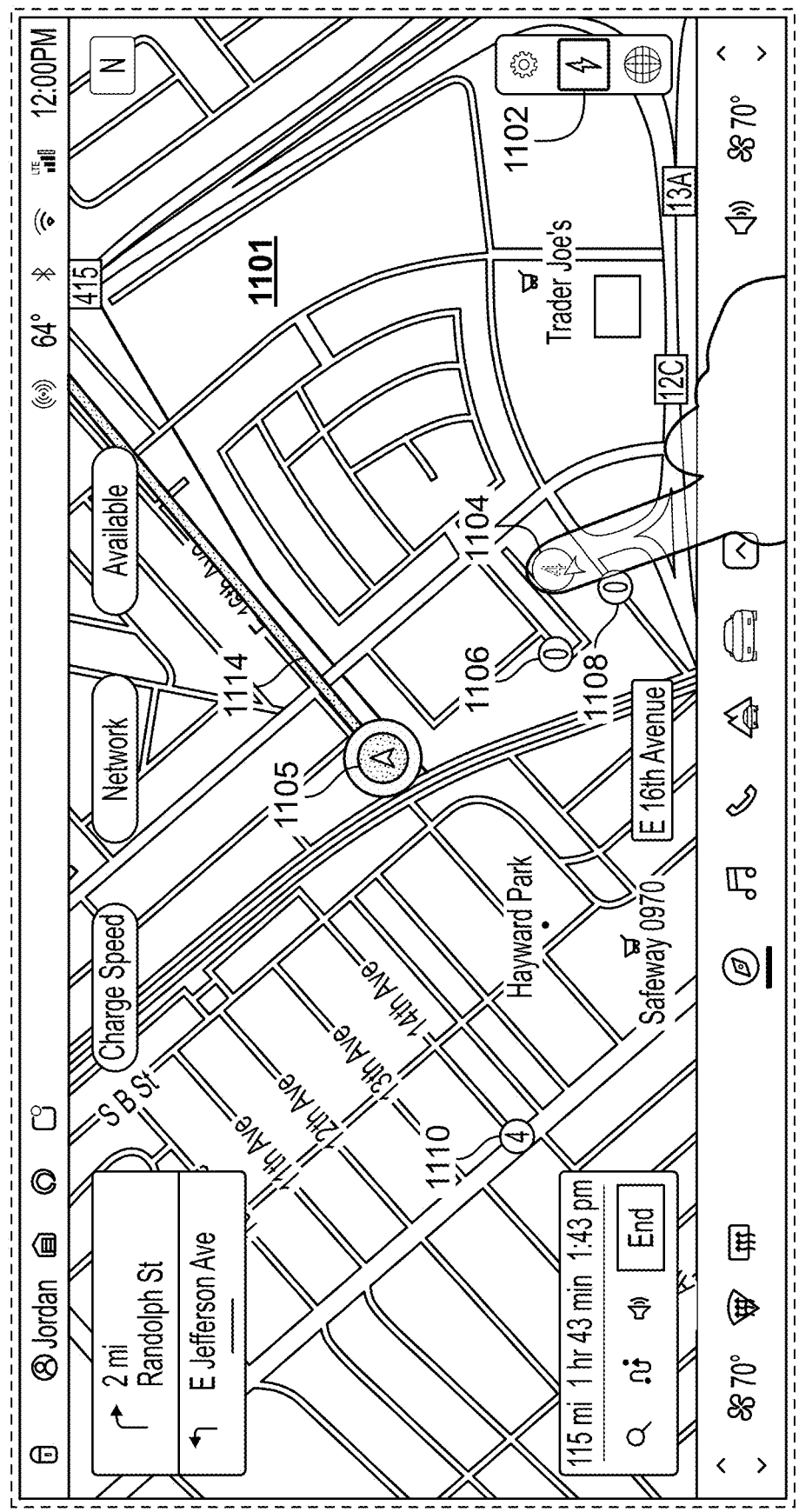
FIGS. 11A-11D show exemplary map interfaces for changing a current destination to an electric charging station, in accordance with some embodiments of the present disclosure.
Figure 11B:
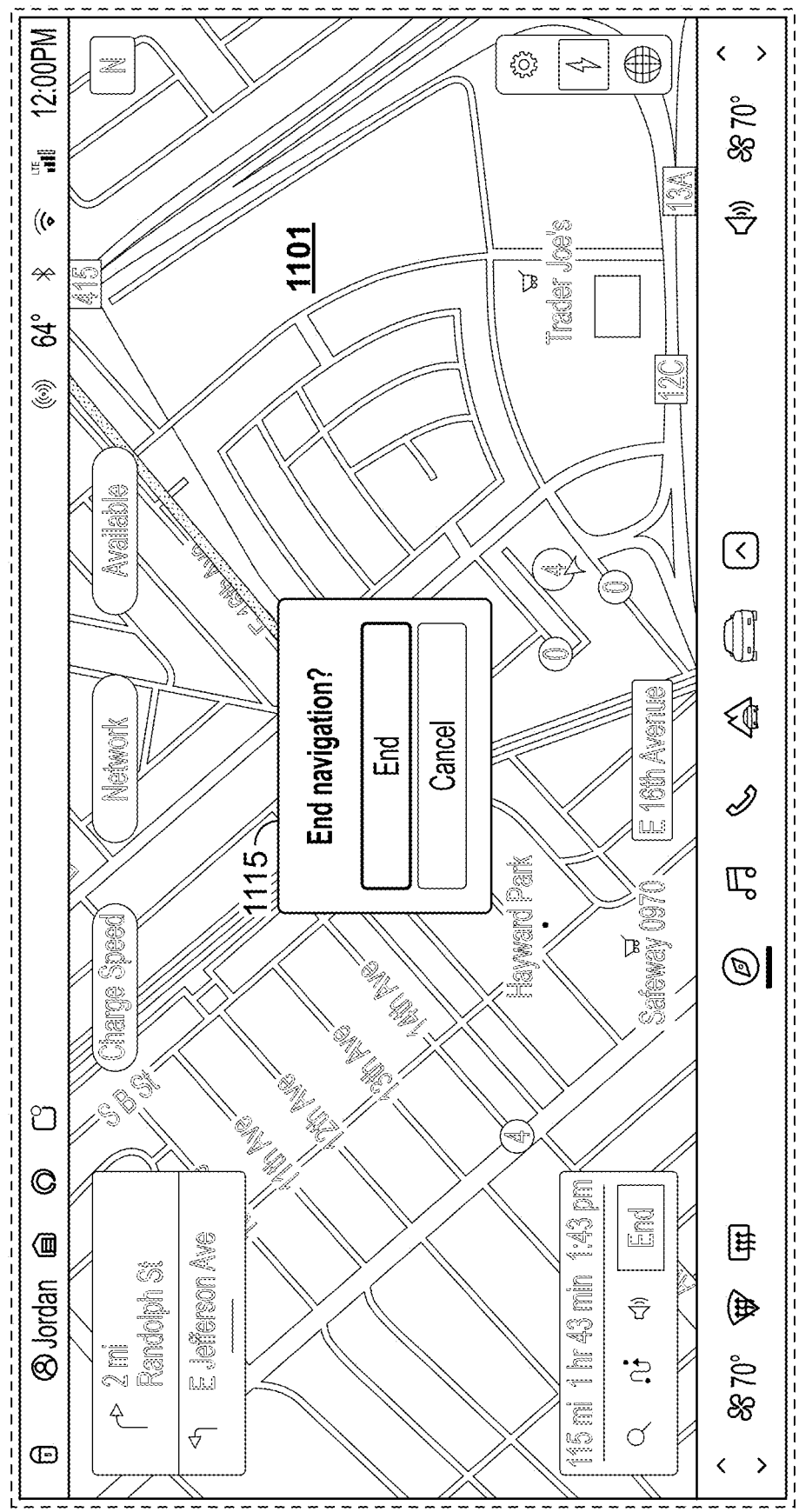

FIGS. 11A-11D show exemplary map interfaces for changing a current destination to an electric charging station, in accordance with some embodiments of the present disclosure. As shown in FIG. 11A, icon 1105 may represent a current location of electric vehicle 201, and a current navigation route 1114 being provided by GPS 234. While current navigation route 1114 is being presented, processing circuitry 202 may receive input selecting icon 1102, which causes a charger overlay of map interface 1101 to be presented comprising icons 1104, 1106, 1108, 1110 corresponding to respective electric charging stations. In response to detecting selection of icon 1104 corresponding to an electric charging station, a prompt 1115 of FIG. 11B may be generated for presentation, prompting the driver to indicate whether he or she desires to end current navigation route 1114 and begin receiving navigation instructions to navigate to the selected icon 1104.

Figure 11C:
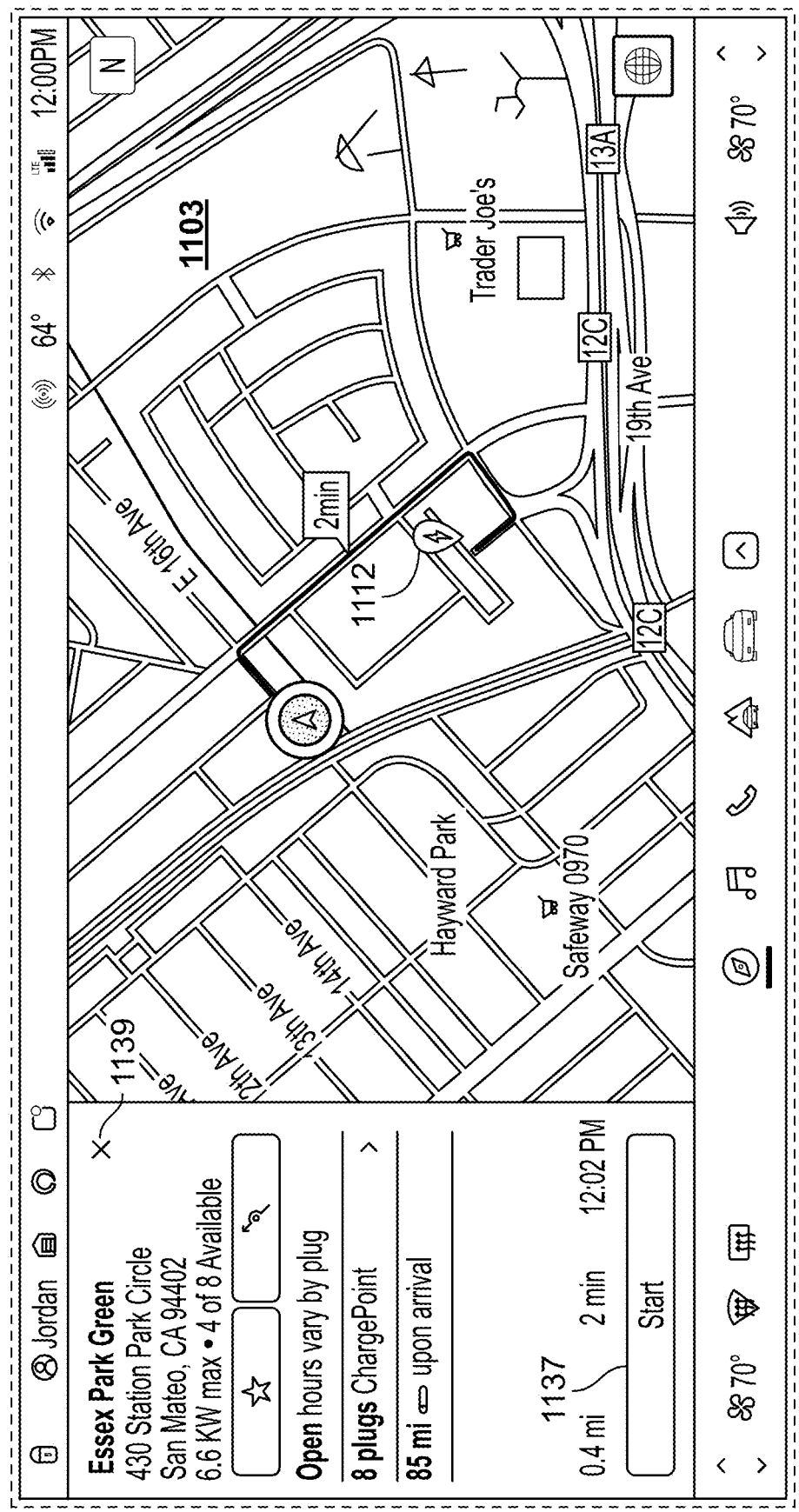
Figure 11D:
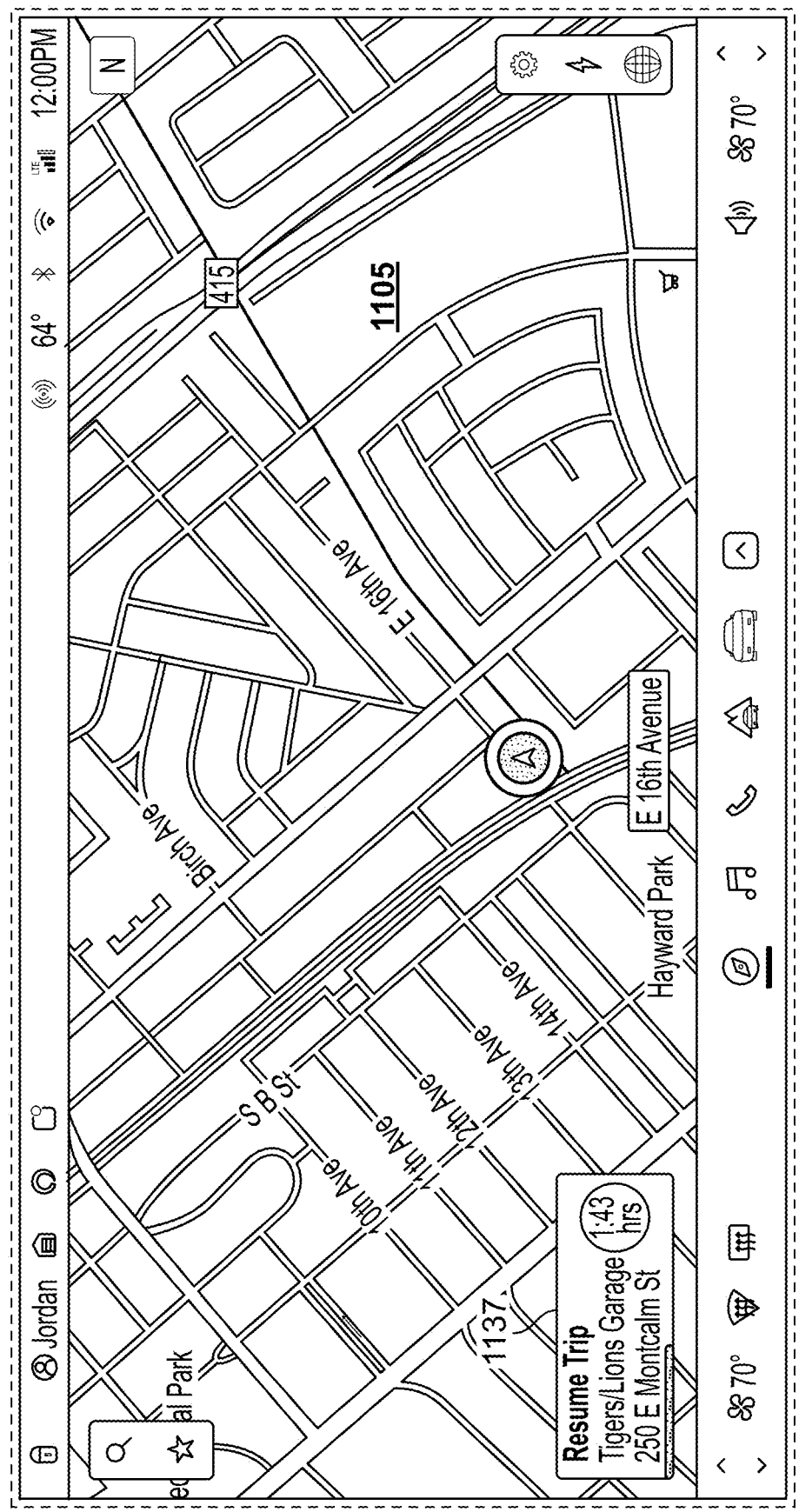

If processing circuitry 202 receives a response to prompt 1115 indicating that the driver desires to end a current navigation, map interface 1103 of FIG. 11C may be presented at display 230 and/or user device 238 to provide selectable option 1137 to request navigation instructions for a suggested route to navigate to electric charging station 1112 corresponding to the selected icon 1104. If selection of option 1137 is received, navigation instructions to electric charging station 1112 may be provided. On the other hand, if selection of option 1139 is received indicating the driver desires to close out the detailed card associated with electric charger 1112, map interface 1105 of FIG. 11D may be generated for display comprising a selectable option 1141 to resume the previously canceled trip associated with navigation route 1114. In some embodiments, if vehicle 201 is offline, e.g., unable to connect to the Internet or other communications network, an indication of a number of available plugs may be replaced with a total number of plugs available at electric charging station 1012.

Figure 12:
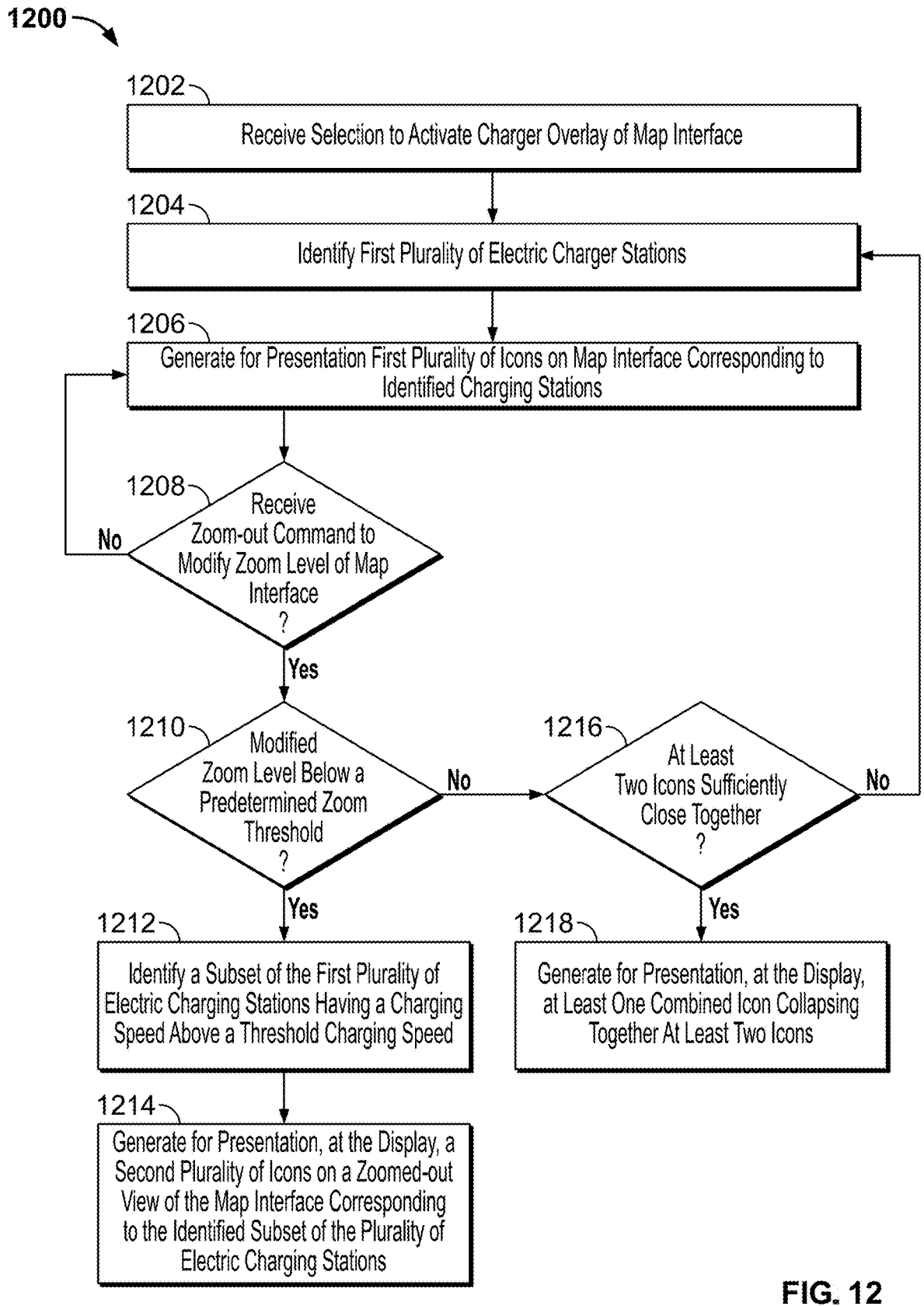
FIG. 12 shows a flowchart of an illustrative process for adjusting presentation of icons corresponding to electric charging stations based on a zoom command, in accordance with some embodiments of the present disclosure.

FIG. 12 shows a flowchart of an illustrative process for 1200 adjusting presentation of icons corresponding to electric charging stations based on a zoom command, in accordance with some embodiments of the present disclosure. Process 1200 may be performed at least in part by processing circuitry 202 and/or user device 238.

At 1202, processing circuitry 202 and/or input circuitry 216 may detect selection of option 302 to activate a charger overlay of map interface 300. Map interface 300 may be displayed at display 230 of electric vehicle 201 and/or at user device 238.

At 1204, processing circuitry 202 may identify a first plurality of electric chargers in a portion of map interface 300 currently being displayed. In some embodiments, processing circuitry may perform this identification based on information received from GPS 234 and/or one or more servers 240.

At 1206, processing circuitry 202 may generate for presentation at map interface 300 a first plurality of icons 304, 306, 309, 310, 311, 312 corresponding to the first plurality of identified electric charging stations. The presentation of each icon may vary based on parameters determined for each electric charging station. For example, a color of each icon may depend on an electric charging speed provided by electric chargers at a given electric charging station, a size of an icon may depend on a total number of electric chargers at a given electric charging station, and a number depicted in or around each icon may correspond to a number of electric chargers available for use at the given electric charging station.

At 1208, processing circuitry 202 may detect a zoom out command (e.g., a zoom-out command or zoom-in command to modify a zoom level of map interface 300). For example, map interface 300 may correspond to a first zoom level, e.g., zoom level 10, and the zoom-out command may comprise an indication to processing circuitry 202 and/or output circuitry 220 to zoom out to a zoom level 9. In some embodiments, the zoom-out command may be received in the form of a user gesture on a touch screen or any other suitable input. If no zoom-out command is received, processing may proceed to 1206, e.g., processing circuitry 202 may continue to generate for presentation the identified icons 304, 306, 309, 310, 311, 312.

At 1210, processing circuitry 202 may determine whether the modified zoom level associated with the received zoom-out command corresponds to a zoom level that is below a predetermined zoom threshold (e.g., zoom level 9). Processing may proceed to 1216 if the modified zoom level is not below a predetermined zoom threshold (e.g., if the zoom command and threshold are equal to the same zoom level). If processing circuitry 202 determines that the modified zoom level is below the predetermined zoom threshold, processing may proceed to 1212.

At 1212, processing circuitry 202 may identify a subset (310, 312) of the plurality of electric charging stations 304, 306, 309, 310, 311, 312 having a charging speed above a threshold charging speed (e.g., electric charging speed 638).

At 1214, processing circuitry 202 may generate for presentation, at display 230, a second plurality of icons 810, 812 on a zoomed-out view of map interface 800 corresponding to the identified subset 310, 312 of the plurality of electric charging stations. Such aspects enable presentation, in an easily digestible manner, of electric charging stations having fast charging speeds in the event an operator of vehicle 201 zooms sufficiently far out, e.g., since it is likely such a user may be interested in longer road trip. In some embodiments, processing circuitry 202 may remove icons 304, 306, 309, 311 corresponding to slower electric charging stations, which may help declutter map interface 800 by removing icons representing electric charging stations driver At 1216, processing circuitry 202 may, in a case that the received zoom command corresponds to a zoom level that is not below the predetermined threshold, determine whether at least two icons are sufficiently close together, e.g., as a result of the transition from map interface 300 to map interface 700. If no icons are sufficiently close together, e.g., within a threshold number of pixels, processing may proceed to 1204 to facilitate generating an updated map interface, e.g., with icons at new positions as a result of the zoom-out command, and potentially new icons being identified as a result of the zoom-out command. In some embodiments, the processing performed at 1216 may be performed even if processing circuitry 202 determines the zoom level of the zoom-out command is below the threshold. Processing may proceed to 1218 in response to determining that the zoom-out command caused at least two icons to become sufficiently close together.

At 1218, processing circuitry 202 may generate for presentation at display 230 at least one combined icon 742 by collapsing together icons 308 and 309. In some embodiments, the color of combined icon 742 may reflect the maximum electric charging speed from among icons 308 and 309 used to formulate combined icon 742. Such collapsing together of icons may server as to declutter the map in certain circumstances, and indicate a total number of electric chargers available in a given vicinity regardless of whether such electric chargers are located at the same electric charging station. In some embodiments, if processing circuitry receives a subsequent zoom-in command or selection of combined icon 742, combined icon 742 may be configured to split back apart into icons 308 and 309.

Figure 13:
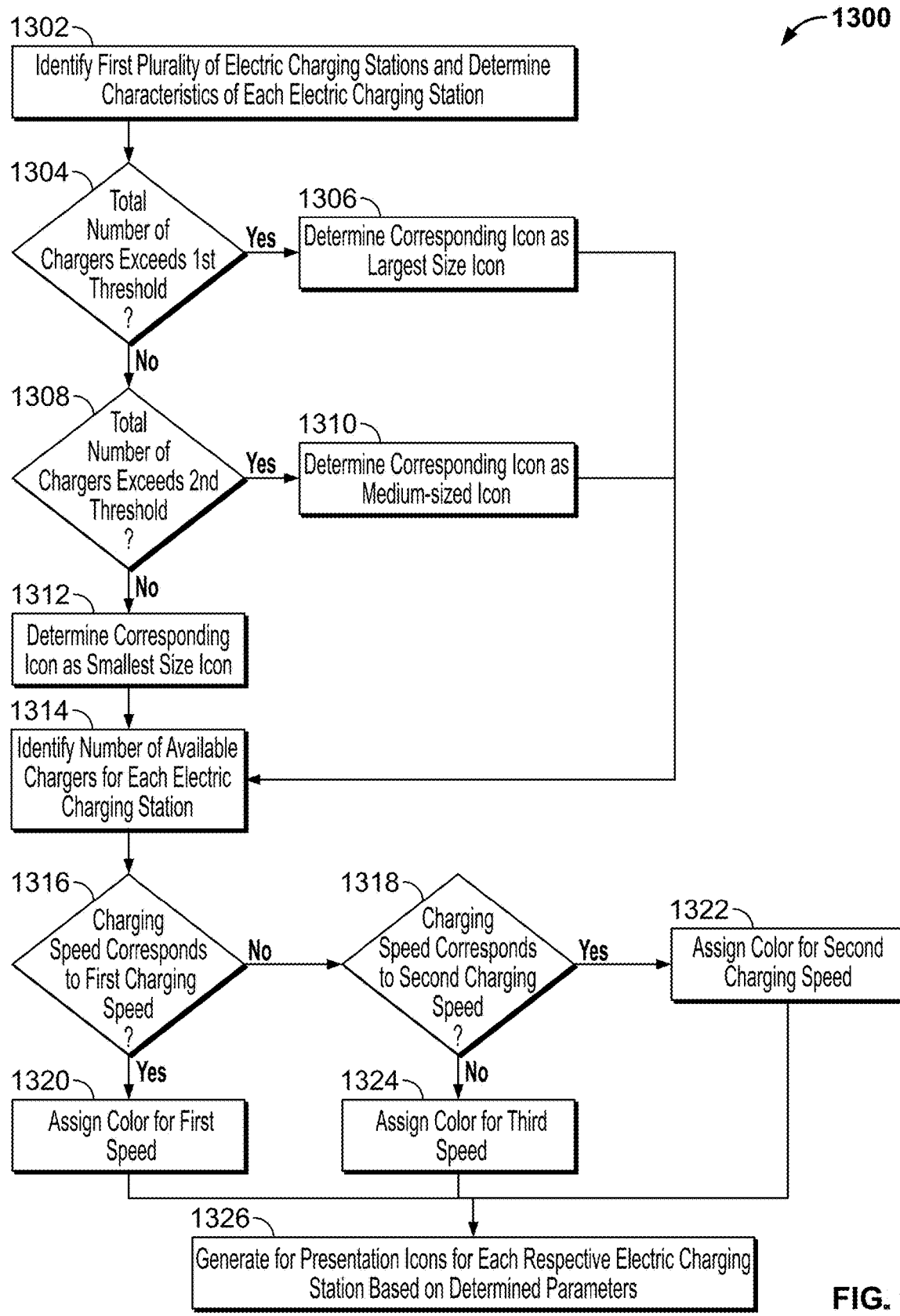
FIG. 13 shows a flowchart of an illustrative process for presenting icons corresponding to electric charging stations, in accordance with some embodiments of the present disclosure.

FIG. 13 shows a flowchart of an illustrative process 1300 for presenting icons corresponding to electric charging stations, in accordance with some embodiments of the present disclosure. Process 1300 may be performed at least in part by processing circuitry 202 and/or user device 238.

At 1302, processing circuitry 202 may identify a plurality of electric charging stations, e.g., corresponding to icons 304, 306, 309, 310, 311, 312, as well as characteristics or parameters of each electric charging station. Such information may be obtained by way of GPS 234 and/or requesting or receiving communications from server 240.

At 1304, processing circuitry 202 may determine, for each identified electric charging station 103, whether a total number of electric chargers exceeds a first threshold number of electric chargers (e.g., 9 or more total electric chargers). In response to determining that the total number of electric chargers at a particular electric charging station 103 exceeds the first threshold, processing may proceed to 1306 where processing circuitry 202 determines that a largest size icon (such as, e.g., the size of icon 308) is suitable for this particular electric charging station. In response to determining that the total number of electric chargers at the particular electric charging station 103 does not exceed the first threshold, processing may proceed to 1308.

At 1308, processing circuitry 202 may determine, for the remaining identified electric charging stations 103 having been determined not to exceed the first threshold, whether a total number of electric chargers exceeds a second threshold number of electric chargers (e.g., 5-8 total electric chargers). In response to determining that the total number of electric chargers at a particular electric charging station 103 exceeds the second threshold, processing may proceed to 1310 where processing circuitry 202 determines that a medium-sized icon (such as, e.g., the size of icon 312) is suitable for this particular electric charging station 103. In response to determining that the total number of electric chargers at the particular electric charging station 103 does not exceed the first threshold, processing may proceed to 1312 where processing circuitry 202 may determine that a smallest size icon (such as, e.g., the size of icon 309) is suitable for the remaining one or more electric charging stations 103 determined as not exceeding the first or second thresholds.

At 1314, processing circuitry 202 may determine the total number of available chargers for each electric charging station 103. For example, for electric charging station 1012, processing circuitry 202 may determine that 4 of 8 plugs 1028 are currently available for use.

At 1316, processing circuitry 202 may determine whether an electric charging speed (e.g., a maximum or average electric charging speed at the electric charging station, or a charging speed of available electric chargers at the electric charging station) corresponds to a first charging speed 636. In response to determining that the electric charging speed of electric charging station 103 corresponds to the first charging speed 636, processing may proceed to 1320 where a color may be assigned to an icon corresponding to electric charging station 103 (e.g., a dark green). In response to determining that the electric charging speed of electric charging station 103 does not correspond to the first charging speed, processing may proceed to 1318.

At 1318, processing circuitry 202 may determine whether an electric charging speed (e.g., a maximum or average electric charging speed at the electric charging station, or a charging speed of available electric chargers at the electric charging station) corresponds to a second charging speed 638. In response to determining that the electric charging speed of electric charging station 103 corresponds to the second charging speed 638, processing may proceed to 1322 where a color may be assigned to an icon corresponding to electric charging station 103 (e.g., a lighter green). In response to determining that the electric charging speed of electric charging station 103 does not correspond to the second charging speed, processing may proceed to 1324, where a color may be assigned based on charging speed 640 (e.g., an even lighter green).

At 1326, processing circuitry 202 may generate for presentation icons 304, 306, 309, 310, 311, 312 for the respective electric charging stations in a manner that reflects the determined parameters. For example, icon 304 is a smallest size icon based on having a relatively low total number of chargers, indicates only one available charger at a current time, and indicates a relatively slow charging speed based on its color. In some embodiments, additional parameters, such as, for example, the parameters shown at detailed card 903, may be provided upon receiving user selection of a particular icon.

Figure 14:
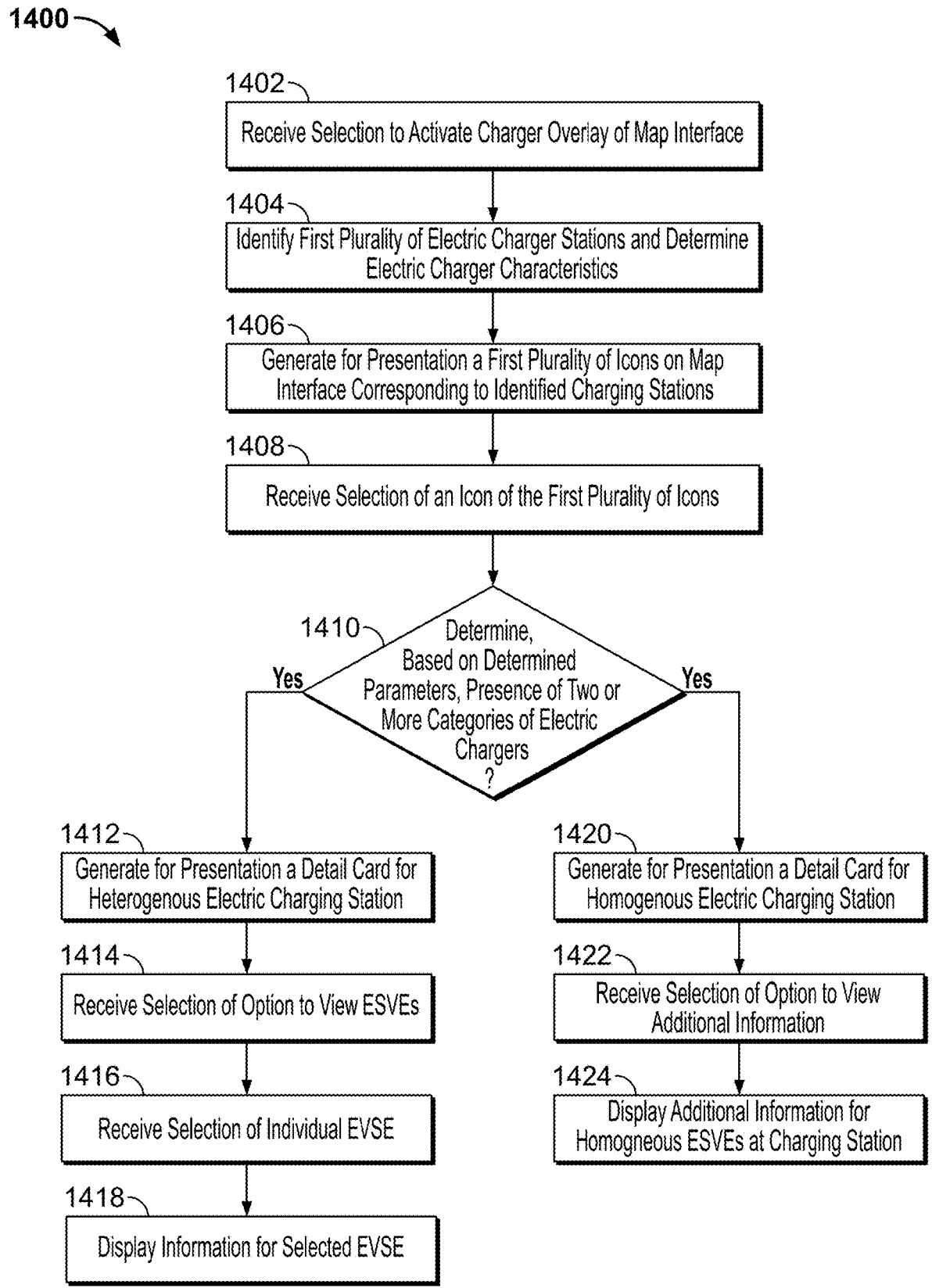
FIG. 14 shows a flowchart of illustrative process for determining whether to present a display suitable for a homogeneous electric charging station or a heterogenous electric charging station, in accordance with some embodiments of the present disclosure.

FIG. 14 shows a flowchart of illustrative process 1400 for determining whether to present a display suitable for a homogeneous electric charging station or a heterogenous electric charging station, in accordance with some embodiments of the present disclosure. Process 1400 may be performed at least in part by processing circuitry 202 and/or user device 238.

At 1402, processing circuitry 202 may receive a selection of icon 902 to activate a charger overlay of map interface 900. In some embodiments, the charger overlay may automatically be presented without detecting selection of icon 902 (e.g., upon selecting an option to view map interface 900).

At 1404, processing circuitry 202 may identify a plurality of electric charging stations corresponding to icons 904, 906, 908, 910, as well as characteristics or parameters of each electric charging station. Such information may be obtained by way of GPS 234 and/or requesting or receiving communications from server 240.

At 1406, processing circuitry 202 may generate for presentation a first plurality of icons 904, 906, 908, 910 on map interface 900 corresponding to the identified charging stations.

At 1408, processing circuitry 202 may receive input (e.g., selection with a cursor, tactile, voice, text, biometric, or any combination thereof) selecting an icon 904 of the icons 904, 906, 908, 910.

At 1410, processing circuitry 202 may determine, based on the parameters determined at 1402, whether two or more categories of electric chargers are present at electric charging station 912 corresponding to selected icon 904. For example, processing circuitry 202 may determine whether one or more of power level 920, hours of operation 924, number of plugs 928, provider 930 differ as between the plugs 928 of electric charging station 912. If each of such parameters is the same for the electric chargers at electric charging station 912, processing may proceed to 1420; otherwise processing may proceed to 1412.

At 1412, processing circuitry 202 may generate for presentation a detail card 1007 for a heterogenous electric charging station. For example, processing circuitry 202 may retrieve from memory 206 a template corresponding to a heterogenous electric charging station, e.g., when electric charging station 1012 comprises electric chargers from two or more categories. Detail card 1007 may comprise various parameters and information regarding electric charging station 1012 corresponding to the selected icon, and may indicate certain parameters, e.g., that hours vary by plug for hours of operation 1024, a max power level of 6.6 kW 1020, that suggest that plugs 1028 may have differing characteristics.

At 1414, processing circuitry 202 may detect selection of option 1045, which may cause display of intermediate summary screen 1009 of each EVSE 1046, 1048, 1050, 1052, 1054 of electric charging station 1012. Intermediate summary screen 1009 may comprise information for each EVSE, such as, for example, a number of available plugs, a name and a power level. Selectable options 1056, 1058, 1060, 1062, 1064 for the respective EVSEs 1046, 1048, 1050, 1052, 1054 of electric charging station 1012 may be provided to enable an operator of electric vehicle 201 to obtain additional information for each EVSE.

At 1416, processing circuitry 202 may detect selection of option 1060 associated with EVSE 1046, which may cause display of detail card 1011 at 1418 comprising further information for EVSE 1046. Certain parameters (e.g., hours of operation 1070, number of available plugs 1072, pricing information and notes 1038, 1040, 1042, 1044) associated with EVSE 1046 may differ from parameters of EVSE 1050 (e.g., hours of operation 1084, number of available plugs 1086, pricing information and notes 1088, 1090, 1092, 1094).

At 1420, processing circuitry 202 may have determined that there is only a single category of electric chargers at electric charging station 912. In such an instance, processing circuitry may generate for display parameter information shown at detail card 903, where such information may be common to each electric charger.

At 1422, processing circuitry 202 may detect selection of option 936 to view additional information regarding the electric chargers at homogenous electric charging station 912.

At 1424, in response to detecting selection of option 936, processing circuitry 202 may cause display of additional information, e.g., price information 938, parking information 940, additional price information 942, and notes 944, corresponding to the electric chargers at homogenous electric charging station 912.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A system for presenting information related to electric charging stations for charging an electric vehicle, the system comprising:
   a display; and
   processing circuitry configured to:
      identify a plurality of electric charging stations;
      generate at the display a map interface having a first plurality of icons at positions on a zoomed-in view of a map corresponding to locations of the identified plurality of electric charging stations;
      detect a zoom out command; and
      in response to detecting the zoom out command:
         identify a subset of the plurality of electric charging stations having a charging speed above a threshold speed; and
         generate at the display a map interface having a second plurality of icons at positions on a zoomed-out view of the map corresponding to locations of the identified subset of the plurality of electric charging stations, wherein the zoomed-out view depicts a larger geographic region than the zoomed-in view.

2. The system of claim 1, wherein the zoomed-out view comprises a view generated in response to determining the zoomed-out view is below a predetermined zoom threshold.

3. The system of claim 1, wherein:
   the first plurality of icons on the map comprise a first icon and a second icon corresponding to locations of a first charging station and a second charging station, respectively, of the plurality of electric charging stations, the first charging station having a first charging speed and the second charging station having a second charging speed;
   the first charging speed is different than the second charging speed;
   each of the first charging speed and the second charging speed exceeds the threshold speed;
   the first icon being of a first color based on the first charging speed;
   the second icon being of a second color based on the second charging speed, the first color being a different color than the second color; and
   the processing circuitry is further configured to:
      identify the first and second icons as the subset of the plurality of electric charging stations having the charging speed above the threshold speed;
      determine the charging speed of the first icon exceeds the charging speed of the second icon; and
      generate, at the display, the map interface having the second plurality of icons at the positions on the zoomed-out view of the map by:
         generating a combined icon of the first color based on the determination that the charging speed of the first icon exceeds the charging speed of the second icon, wherein the combined icon is formed by collapsing the first icon and the second icon together.

4. The system of claim 3, the processing circuitry is configured to generate the combined icon in response to determining that the first icon and the second icon are within a predetermined distance of each other on the map interface.

5. The system of claim 1, wherein the processing circuitry is further configured to:
generate for presentation a selectable option to filter the electric charging stations for which icons are generated for display based on at least one of:
electric charging station availability;
electric charging station provider; or
electric charging station speed.

6. The system of claim 1, wherein the processing circuitry is further configured to:
determine a plurality of characteristics of each respective electric charging station, wherein each respective icon is associated with the plurality of characteristics which comprise:
a color indicative of a charging speed of an electric charger at the electric charging station;
a size indicative of a number of electric chargers at the electric charging station; and
an indication of a number of electric chargers that are available for use at the electric charging station.

7. The system of claim 6, wherein:
one of a lighter color or a darker color is indicative of a relatively higher speed electric charger and one of the lighter color or the darker color is indicative of a relatively lower speed electric charger, and
the color is indicative of a maximum speed electric charger at the electric charging station.

8. The system of claim 1, wherein the processing circuitry is further configured to:
determine respective parameters of an electric charging station of the identified plurality of electric charging stations;
detect selection of an icon corresponding to the electric charging station;
determine, based on the determined parameters, whether there are two or more categories of a plurality of electric chargers of the electric charging station corresponding to the selected icon;
in response to determining there are the two or more categories:
generate for display a graphical user interface comprising a selectable option; and
in response to detecting selection of the selectable option, generating for display respective selectable options for each category of the two or more categories of the plurality of electric chargers, wherein each respective selectable option provides access to a detailed view of information related to at least one electric charger for the respective category.

9. The system of claim 8, wherein the graphical user interface comprising the selectable option further comprises an indication that a parameter varies as between the two or more categories of the plurality of electric chargers.

10. The system of claim 1, wherein the processing circuitry is further configured to:
determine respective parameters of an electric charging station of the identified plurality of electric charging stations;
detect selection of an icon corresponding to the electric charging station;
determine, based on the determined parameters, whether there is a single category of a plurality of electric chargers of the electric charging station corresponding to the selected icon;
in response to determining there is a single category of the plurality of electric chargers:
generate for display an indication of one or more common parameters for each of the plurality of electric chargers of the single category of the plurality of electric chargers.

11. A method for presenting information related to electric charging stations for charging an electric vehicle, the method comprising:
identifying a plurality of electric charging stations;
generating at the display a map interface having a first plurality of icons at positions on a zoomed-in view of a map corresponding to locations of the identified plurality of electric charging stations;
detecting a zoom out command; and
in response to detecting the zoom out command:
identifying a subset of the plurality of electric charging stations having a charging speed above a threshold speed; and
generating at the display a map interface having a second plurality of icons at positions on a zoomed-out view of the map corresponding to locations of the identified subset of the plurality of electric charging stations, wherein the zoomed-out view depicts a larger geographic region than the zoomed-in view.

12. The method of claim 11, wherein the zoomed-out view comprises a view generated in response to determining that the zoomed-out view is below a predetermined zoom threshold.

13. The method of claim 11, wherein:
the first plurality of icons at the positions on the map comprise a first icon and a second icon corresponding to locations of a first charging station and a second charging station, respectively, of the plurality of electric charging stations, the first charging station having a first charging speed and the second charging station having a second charging speed;
the first charging speed is different than the second charging speed;
each of the first charging speed and the second charging speed exceeds the threshold speed;
the first icon being of a first color based on the first charging speed; and
the second icon being of a second color based on the second charging speed, the first color being a different color than the second color,
the method further comprising:
identifying the first and second icons as the subset of the plurality of electric charging stations having the charging speed above the threshold speed; and
determining that the charging speed of the first icon exceeds the charging speed of the second icon, wherein:
the generating at the display the map interface having the second plurality of icons at the positions on the zoomed-out view of the map comprises generating for presentation a combined icon of the first color based on the determination that the charging speed of the first icon exceeds the charging speed of the second icon, wherein the combined icon is formed by collapsing the first icon and the second icon together.

14. The method of claim 11, further comprising:
generating for presentation a selectable option to filter the electric charging stations for which icons are generated for display based on at least one of:
electric charging station availability;
electric charging station provider; or
electric charging station speed.

15. The method of claim 11, further comprising:
determining a plurality of characteristics of each respective electric charging station, wherein each respective icon is associated with the plurality of characteristics which comprise:
a color indicative of a charging speed of an electric charger at the electric charging station;
a size indicative of a number of electric chargers at the electric charging station; and
an indication of a number of electric chargers that are available for use at the electric charging station.

16. The method of claim 11, further comprising:
determining respective parameters of an electric charging station of the identified plurality of electric charging stations;
detecting selection of an icon corresponding to the electric charging station;
determining, based on the determined parameters, whether there are two or more categories of a plurality of electric chargers of the electric charging station corresponding to the selected icon; and
in response to determining there are two or more categories of the plurality of electric chargers:
generating for display a graphical user interface comprising a selectable option; and
in response to detecting selection of the selectable option, generating for display respective selectable options for each category of the two or more categories of the electric chargers, wherein each respective selectable option provides access to a detailed view of information related to at least one electric charger for the respective category.

17. A non-transitory computer-readable medium having non-transitory computer-readable instructions encoded thereon that, when executed by a processor, causes the processor to:
identify a plurality of electric charging stations;
generate for presentation, at the display, a map interface having a first plurality of icons at positions on a zoomed-in view of a map corresponding to locations of the identified plurality of electric charging stations;
detect a zoom out command; and
in response to detecting the zoom out command:
identify a subset of the plurality of electric charging stations having a charging speed above a threshold speed; and
generate for presentation, at the display, a map interface having a second plurality of icons at positions on a zoomed-out view of the map corresponding to locations of the identified subset of the plurality of electric charging stations, wherein the zoomed-out view depicts a larger geographic region than the zoomed-in view.

18. The non-transitory computer-readable medium of claim 17, wherein the execution of the instructions causes the zoomed-out view to comprise a view generated in response to determining the zoomed-out view is below a predetermined zoom threshold.

19. The non-transitory computer-readable medium of claim 17, wherein:
the first plurality of icons at the positions on the map comprise a first icon and a second icon corresponding to locations of a first charging station and a second charging station, respectively, of the plurality of electric charging stations, the first charging station having a first charging speed and the second charging station having a second charging speed;
the first charging speed is different than the second charging speed;
each of the first charging speed and the second charging speed exceeds the threshold speed;
the first icon being of a first color based on the first charging speed;
the second icon being of a second color based on the second charging speed, the first color being a different color than the second color; and
the execution of the instructions further causes the processor to:
identify the first and second icons as the subset of the plurality of electric charging stations having the charging speed above the threshold speed;
determine the charging speed of the first icon exceeds the charging speed of the second icon; and
generate, at the display, the map interface having the second plurality of icons at the positions on the zoomed-out view of the map by:
generating a combined icon of the first color based on the determination that the charging speed of the first icon exceeds the charging speed of the second icon, wherein the combined icon is formed by collapsing the first icon and the second icon together.

20. The non-transitory computer-readable medium of claim 17, the execution of the instructions further causes the processor to:
determine respective parameters of an electric charging station of the identified plurality of electric charging stations;
detect selection of an icon corresponding to the electric charging station;
determine, based on the determined parameters, whether there are two or more categories of a plurality of electric chargers of the electric charging station corresponding to the selected icon; and
in response to determining there are two or more categories of the plurality of electric chargers:
generate for display a graphical user interface comprising a selectable option; and
in response to detecting selection of the selectable option, generate for display respective selectable options for each category of the two or more categories of the electric chargers, wherein each respective selectable option provides access to a detailed view of information related to at least one electric charger for the respective category.

* * * * *